United States Patent
Gottula et al.

(10) Patent No.: US 11,373,121 B2
(45) Date of Patent: Jun. 28, 2022

(54) METHOD TO INCREASE DISCOVERY PIPELINE HIT RATES AND LAB TO FIELD TRANSLATION

(71) Applicant: SAS Institute Inc., Cary, NC (US)

(72) Inventors: John Wesley Gottula, Fuquay-Varina, NC (US); Bryan Matthew Mutell, Raleigh, NC (US); Michael Lee Henderson, II, Saint Johns, FL (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/483,093

(22) Filed: Sep. 23, 2021

(65) Prior Publication Data

US 2022/0114488 A1    Apr. 14, 2022

Related U.S. Application Data

(60) Provisional application No. 63/118,526, filed on Nov. 25, 2020, provisional application No. 63/089,670, filed on Oct. 9, 2020.

(51) Int. Cl.
*G06N 20/00* (2019.01)
*G06N 5/02* (2006.01)

(52) U.S. Cl.
CPC .............. *G06N 20/00* (2019.01); *G06N 5/02* (2013.01)

(58) Field of Classification Search
CPC ................................. G06N 20/00; G06N 5/02
See application file for complete search history.

(56) References Cited

U.S. PATENT DOCUMENTS

| | | | |
|---|---|---|---|
| 2017/0098032 A1 | 4/2017 | Desai et al. | |
| 2020/0098449 A1 | 3/2020 | Simonetta et al. | |
| 2020/0342478 A1* | 10/2020 | Dalinina | G06Q 30/0278 |
| 2020/0342597 A1* | 10/2020 | Chukka | G06K 9/6256 |
| 2020/0379454 A1* | 12/2020 | Trinh | G06N 3/0454 |
| 2022/0115092 A1* | 4/2022 | Dominguez-Nunez | C12Q 1/06 |

OTHER PUBLICATIONS

Zhang, Lu, et al. "From machine learning to deep learning: progress in machine intelligence for rational drug discovery." Drug discovery today 22.11 (2017): 1680-1685. (Year: 2017).*

(Continued)

*Primary Examiner* — Kevin W Figueroa
(74) *Attorney, Agent, or Firm* — Tiffany E. Monroe

(57) ABSTRACT

The computing device transforms lab data and field data into a first format suitable for execution with a supervised machine learning model to determine an input variable importance for a first set of input variables in predicting a field outcome. Based on the determination, the computing device generates one or more logical rules of decision metrics, selects the one or more input variables that yields a higher input variable importance, and generates one or more pass-fail indicators. The computing device combines the one or more pass-fail indicators and generates one or more prediction factor rules. The computing device transforms the field data and the one or more prediction factor rules into a second format suitable for execution with a model to determine a treatment effect for the one or more prediction factor rules. The computing device selects the prediction factor rule that maximizes the treatment effect.

30 Claims, 29 Drawing Sheets
(5 of 29 Drawing Sheet(s) Filed in Color)

(56) References Cited

OTHER PUBLICATIONS

Salungyu et al., "From lab to field: Open tools facilitating the translation of maize root traits", Field Crops Research, Jun. 24, 2020, 11 pages.

Carpenter et al., "Machine Learning-based Virtual Screening and Its Applications to Alzheimer's Drug Discovery: A Review", Current Pharmaceutical Design, 2018, pp. 3347-3358, vol. 24, No. 28.

Scheeder et al., "Machine learning and image-based profiling in drug discovery", Current Opinion in Systems Biology, May 26, 2018, pp. 43-52.

Exxact Corporation, "Shortcuts to Simulation: How Deep Learning Accelerates Virtual Screening for Drug Discovery", accessed from: https://www.exxactcorp.com/blog/Deep-Learning/shortcuts-to-simulation-how-deep-learning-accelerates-virtual-screening-for-drug-discovery, May 12, 2020, 1 page.

\* cited by examiner

Execute Statistical Model

- Execute statistical model to find treatment effect for each prediction factor rule

- The treatment effect is the amount by which compounds identified by the prediction factor rule outperform other compounds in the field trials

- Select rule that maximizes treatment effect

- Example rule: "2/3 of assays A, B, and C exhibit at least 50% inhibition at 0.2 ppm or fewer."

| LAB RESULTS | | | | |
|---|---|---|---|---|
| Compound | PPM | Assay A | Assay B | Assay C |
| XXX | 1 | 0.1 | 0.1 | 0 |
| XXX | 2 | 0.5 | 0.4 | 0.4 |
| XXX | 3 | 0.7 | 0.7 | 0.7 |
| YYY | 1 | 0.1 | 0.2 | 0.3 |
| YYY | 2 | 0.5 | 0.3 | 0.3 |
| YYY | 3 | 0.6 | 0.7 | 1 |
| ZZZ | 1 | 0.1 | 0.3 | 0.3 |
| ZZZ | 2 | 0.6 | 0.3 | 0.5 |
| ZZZ | 3 | 0.8 | 0.6 | 0.8 |

FIG. 4

| Strain ▲ | nodules_0.19531 | nodules_0.39063 | nodules_0.78125 | nodules_1.56250 |
|---|---|---|---|---|
| Anabaena_circinalis | 2.977701354 | 0 | 5.37468793 | 0.472351682 |
| Anabaena_variabilis | 4.94 | 4.943333333 | 12.47666667 | 31.1 |
| Azotobacter_chroococcum | 95.84855321 | 98.94799293 | 98.94345289 | 99.21258015 |
| Azotobacter_vinelandii | 9.38378168 | 5.191103963 | 4.574075249 | 6.666666667 |
| Frankia_alni | 17.86333333 | 26.26666667 | 38.83333333 | 51.36666667 |

FIG. 5

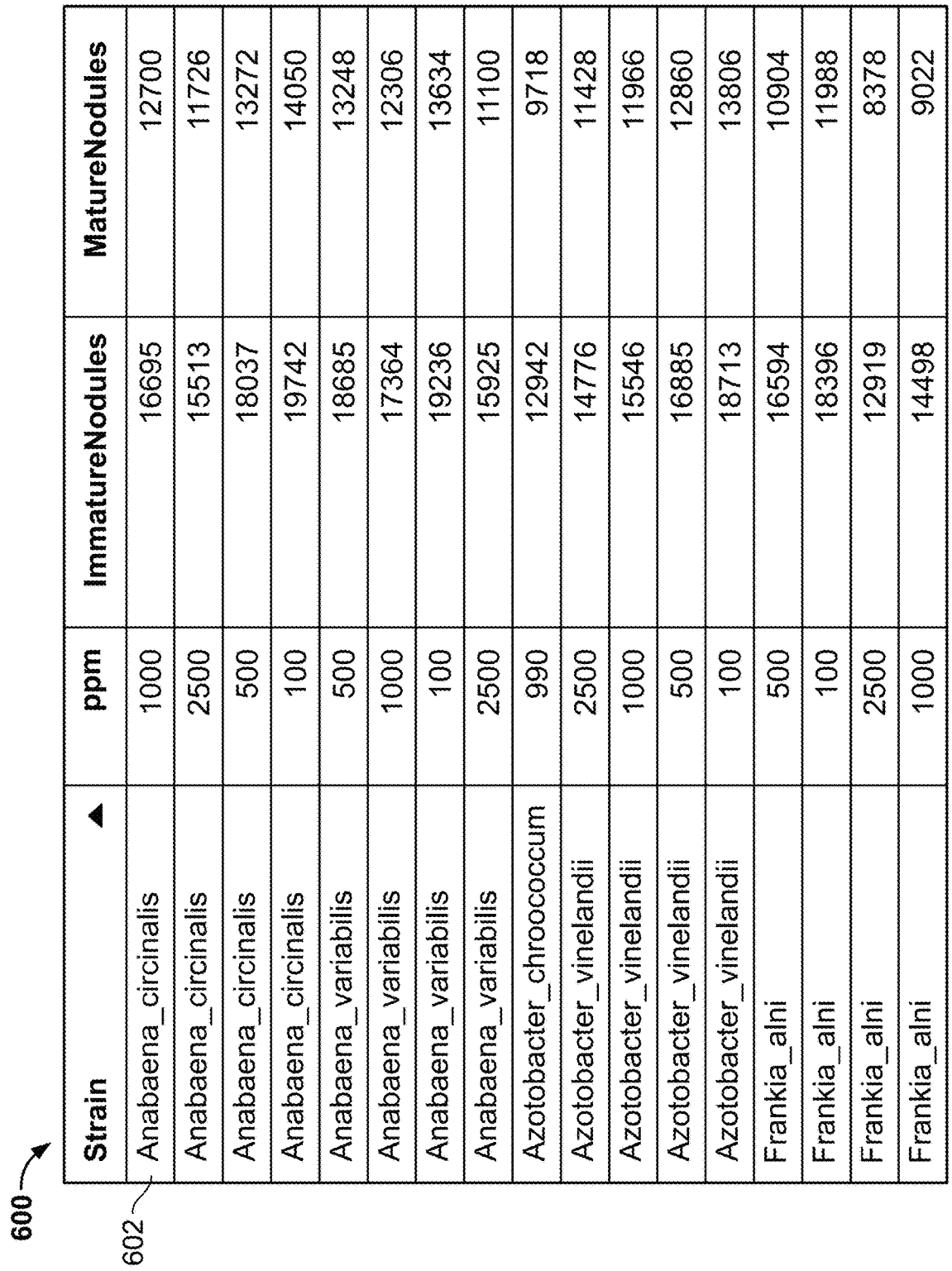

FIG. 6

| Strain ▲ | ppm | ImmatureNodules | MatureNodules |
|---|---|---|---|
| Anabaena_circinalis | 1000 | 16695 | 12700 |
| Anabaena_circinalis | 2500 | 15513 | 11726 |
| Anabaena_circinalis | 500 | 18037 | 13272 |
| Anabaena_circinalis | 100 | 19742 | 14050 |
| Anabaena_variabilis | 500 | 18685 | 13248 |
| Anabaena_variabilis | 1000 | 17364 | 12306 |
| Anabaena_variabilis | 100 | 19236 | 13634 |
| Anabaena_variabilis | 2500 | 15925 | 11100 |
| Azotobacter_chroococcum | 990 | 12942 | 9718 |
| Azotobacter_vinelandii | 2500 | 14776 | 11428 |
| Azotobacter_vinelandii | 1000 | 15546 | 11966 |
| Azotobacter_vinelandii | 500 | 16885 | 12860 |
| Azotobacter_vinelandii | 100 | 18713 | 13806 |
| Frankia_alni | 500 | 16594 | 10904 |
| Frankia_alni | 100 | 18396 | 11988 |
| Frankia_alni | 2500 | 12919 | 8378 |
| Frankia_alni | 1000 | 14498 | 9022 |

| Strain | CFU/mL | ImmatureNodules | MatureNodules | nodules_0.19531 | nodules_0.39063 |
|---|---|---|---|---|---|
| Anabaena_circinalis | 100 | 19742 | 14050 | 2.977701354 | 0 |
| Anabaena_circinalis | 500 | 18037 | 13272 | 2.977701354 | 0 |
| Anabaena_circinalis | 1000 | 16695 | 12700 | 2.977701354 | 0 |
| Anabaena_circinalis | 2500 | 15513 | 11726 | 2.977701354 | 0 |
| Anabaena_variabilis | 100 | 19236 | 13634 | 4.94 | 4.943333333 |
| Anabaena_variabilis | 500 | 18685 | 13248 | 4.94 | 4.943333333 |
| Anabaena_variabilis | 1000 | 17364 | 12306 | 4.94 | 4.943333333 |
| Anabaena_variabilis | 2500 | 15925 | 11100 | 4.94 | 4.943333333 |
| Azotobacter_chroococcum | 990 | 12942 | 9718 | 95.84855321 | 98.94799293 |
| Azotobacter_vinelandii | 100 | 18713 | 13806 | 9.38378168 | 5.159103963 |
| Azotobacter_vinelandii | 500 | 16885 | 12860 | 9.38378168 | 5.159103963 |
| Azotobacter_vinelandii | 1000 | 15546 | 11966 | 9.38378168 | 5.159103963 |
| Azotobacter_vinelandii | 2500 | 14776 | 11428 | 9.38378168 | 5.159103963 |
| Frankia_alni | 100 | 18396 | 11988 | 17.86333333 | 26.26666667 |
| Frankia_alni | 500 | 16594 | 10904 | 17.86333333 | 26.26666667 |
| Frankia_alni | 1000 | 14498 | 9022 | 17.86333333 | 26.26666667 |
| Frankia_alni | 2500 | 12919 | 8378 | 17.86333333 | 26.26666667 |

|  | If two of these three conditions are satisfied...(>= means greater than or equal to) | | | Rule components | | | Excel Syntax |
|---|---|---|---|---|---|---|---|
| Name of the rule | | | | | | | |
| Rule name | Condition 1 | Condition 2 | Condition 3 | If PC>= | If AS>= | If CS>= | Pass (1)/Fail (0) |
| pc_10as_0cs_0 | pc>=10 | as>=0 | cs>=0 | 10 | 0 | 0 | 0 |
| pc_10as_0cs_10 | pc>=10 | as>=0 | cs>=10 | 10 | 0 | 10 | 0 |
| pc_10as_0cs_100 | pc>=10 | as>=0 | cs>=100 | 10 | 0 | 100 | 0 |
| pc_10as_0cs_20 | pc>=10 | as>=0 | cs>=20 | 10 | 0 | 20 | 0 |
| pc_10as_0cs_30 | pc>=10 | as>=0 | cs>=30 | 10 | 0 | 30 | 0 |
| pc_10as_0cs_40 | pc>=10 | as>=0 | cs>=40 | 10 | 0 | 40 | 0 |
| pc_10as_0cs_50 | pc>=10 | as>=0 | cs>=50 | 10 | 0 | 50 | 0 |
| pc_10as_0cs_60 | pc>=10 | as>=0 | cs>=60 | 10 | 0 | 60 | 0 |
| pc_10as_0cs_70 | pc>=10 | as>=0 | cs>=70 | 10 | 0 | 70 | 0 |
| pc_10as_0cs_80 | pc>=10 | as>=0 | cs>=80 | 10 | 0 | 80 | 0 |
| pc_10as_0cs_90 | pc>=10 | as>=0 | cs>=90 | 10 | 0 | 90 | 0 |
| pc_10as_100cs_0 | pc>=10 | as>=100 | cs>=0 | 10 | 100 | 0 | 0 |
| pc_10as_100cs_10 | pc>=10 | as>=100 | cs>=10 | 10 | 100 | 10 | 0 |
| pc_10as_100cs_100 | pc>=10 | as>=100 | cs>=100 | 10 | 100 | 100 | 1 |
| pc_10as_100cs_20 | pc>=10 | as>=100 | cs>=20 | 10 | 100 | 20 | 0 |
| pc_10as_100cs_30 | pc>=10 | as>=100 | cs>=30 | 10 | 100 | 30 | 0 |
| pc_10as_100cs_40 | pc>=10 | as>=100 | cs>=40 | 10 | 100 | 40 | 0 |
| pc_10as_100cs_50 | pc>=10 | as>=100 | cs>=50 | 10 | 100 | 50 | 0 |
| pc_10as_100cs_60 | pc>=10 | as>=100 | cs>=60 | 10 | 100 | 60 | 1 |
| pc_10as_100cs_70 | pc>=10 | as>=100 | cs>=70 | 10 | 100 | 70 | 1 |
| pc_10as_100cs_80 | pc>=10 | as>=100 | cs>=80 | 10 | 100 | 80 | 1 |
| pc_10as_100cs_90 | pc>=10 | as>=100 | cs>=90 | 10 | 100 | 90 | 1 |
| pc_10as_10cs_0 | pc>=10 | as>=10 | cs>=0 | 10 | 10 | 0 | 0 |
| pc_10as_10cs_10 | pc>=10 | as>=10 | cs>=10 | 10 | 10 | 10 | 0 |
| pc_10as_10cs_100 | pc>=10 | as>=10 | cs>=100 | 10 | 10 | 100 | 0 |
| pc_10as_10cs_20 | pc>=10 | as>=10 | cs>=20 | 10 | 10 | 20 | 0 |
| pc_10as_10cs_30 | pc>=10 | as>=10 | cs>=30 | 10 | 10 | 30 | 0 |
| pc_10as_10cs_40 | pc>=10 | as>=10 | cs>=40 | 10 | 10 | 40 | 0 |
| pc_10as_10cs_50 | pc>=10 | as>=10 | cs>=50 | 10 | 10 | 50 | 0 |
| pc_10as_10cs_60 | pc>=10 | as>=10 | cs>=60 | 10 | 10 | 60 | 0 |
| pc_10as_10cs_70 | pc>=10 | as>=10 | cs>=70 | 10 | 10 | 70 | 0 |
| pc_10as_10cs_80 | pc>=10 | as>=10 | cs>=80 | 10 | 10 | 80 | 0 |
| pc_10as_10cs_90 | pc>=10 | as>=10 | cs>=90 | 10 | 10 | 90 | 0 |
| pc_10as_20cs_0 | pc>=10 | as>=20 | cs>=0 | 10 | 20 | 0 | 0 |
| pc_10as_20cs_10 | pc>=10 | as>=20 | cs>=10 | 10 | 20 | 10 | 0 |
| pc_10as_20cs_100 | pc>=10 | as>=20 | cs>=100 | 10 | 20 | 100 | 0 |
| pc_10as_20cs_20 | pc>=10 | as>=20 | cs>=20 | 10 | 20 | 20 | 0 |
| pc_10as_20cs_30 | pc>=10 | as>=20 | cs>=30 | 10 | 20 | 30 | 0 |
| pc_10as_20cs_40 | pc>=10 | as>=20 | cs>=40 | 10 | 20 | 40 | 0 |
| pc_10as_20cs_50 | pc>=10 | as>=20 | cs>=50 | 10 | 20 | 50 | 0 |
| pc_10as_20cs_60 | pc>=10 | as>=20 | cs>=60 | 10 | 20 | 60 | 0 |

FIG. 18

| Strain | CFU_ML | Replication | Field Outcomes | | | | | |
|---|---|---|---|---|---|---|---|---|
| | | | MatureNodules | ImmatureNodules | pc_10as_0cs_0 | pc_10as_0cs_10 | pc_10as_0cs_100 | pc_10as_0cs_20 |
| Anabaena_circinalis | 2500 | 2 | 916 | 1118 | 1 | 0 | 1 | 1 |
| Anabaena_circinalis | 250 | 2 | 732 | 537 | 1 | 0 | 1 | 1 |
| Anabaena_circinalis | 2500 | 1 | 234 | 996 | 1 | 0 | 1 | 1 |
| Anabaena_circinalis | 100 | 2 | 270 | 964 | 1 | 0 | 1 | 1 |
| Anabaena_circinalis | 500 | 2 | 750 | 548 | 1 | 0 | 1 | 1 |
| Anabaena_circinalis | 1000 | 2 | 740 | 580 | 1 | 0 | 1 | 1 |
| Anabaena_circinalis | 250 | 1 | 608 | 573 | 1 | 0 | 1 | 1 |
| Anabaena_circinalis | 100 | 1 | 608 | 566 | 1 | 0 | 1 | 1 |
| Anabaena_circinalis | 1000 | 1 | 620 | 606 | 1 | 0 | 1 | 0 |
| Anabaena_circinalis | 500 | 1 | 270 | 928 | 1 | 0 | 0 | 0 |
| Anabaena_variabilis | 250 | 2 | 862 | 646 | 1 | 0 | 0 | 0 |
| Anabaena_variabilis | 100 | 2 | 816 | 687 | 1 | 0 | 0 | 0 |
| Anabaena_variabilis | 250 | 1 | 608 | 573 | 1 | 0 | 0 | 0 |
| Anabaena_variabilis | 100 | 1 | 592 | 571 | 1 | 0 | 0 | 0 |
| Anabaena_variabilis | 500 | 1 | 216 | 1118 | 1 | 0 | 0 | 0 |
| Anabaena_variabilis | 2500 | 2 | 1014 | 1360 | 0 | 0 | 0 | 1 |
| Anabaena_variabilis | 2500 | 1 | 252 | 1236 | 0 | 0 | 0 | 1 |
| Anabaena_variabilis | 1000 | 2 | 908 | 674 | 0 | 0 | 0 | 1 |
| Anabaena_variabilis | 1000 | 1 | 700 | 672 | 0 | 0 | 0 | 1 |
| Anabaena_variabilis | 500 | 2 | 288 | 1228 | 0 | 0 | 0 | 1 |
| Frankia_alni | 2500 | 2 | 1020 | 1232 | 0 | 0 | 0 | 1 |
| Frankia_alni | 2500 | 1 | 756 | 601 | 0 | 0 | 0 | 1 |
| Frankia_alni | 1000 | 2 | 270 | 1172 | 0 | 0 | 0 | 1 |
| Frankia_alni | 1000 | 1 | 788 | 552 | 0 | 0 | 0 | 1 |
| Frankia_alni | 500 | 2 | 744 | 695 | 0 | 0 | 0 | 1 |
| Frankia_alni | 500 | 1 | 198 | 1094 | 0 | 0 | 0 | 1 |
| Frankia_alni | 250 | 2 | 808 | 626 | 0 | 0 | 0 | 1 |
| Frankia_alni | 250 | 1 | 650 | 629 | 0 | 0 | 0 | 1 |
| Frankia_alni | 100 | 2 | 252 | 1136 | 0 | 0 | 0 | 1 |
| Frankia_alni | 100 | 1 | 636 | 580 | 0 | 0 | 0 | 1 |

FIG. 19

| Lab Rules Applied to Compound or Biological Entity | | | | | |
|---|---|---|---|---|---|
| pc_10as_0cs_30 | pc_10as_0cs_40 | pc_10as_0cs_50 | pc_10as_0cs_60 | pc_10as_0cs_70 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 0 | 1 | 1 | 1 | 1 |
| 0 | 1 | 1 | 1 | 1 |
| 0 | 1 | 1 | 1 | 1 |
| 0 | 1 | 1 | 1 | 1 |
| 0 | 1 | 1 | 1 | 1 |
| 0 | 1 | 1 | 1 | 1 |
| 0 | 0 | 0 | 0 | 1 |
| 0 | 0 | 0 | 0 | 1 |
| 0 | 0 | 0 | 0 | 1 |
| 0 | 0 | 0 | 0 | 1 |
| 0 | 0 | 0 | 0 | 1 |
| 0 | 0 | 0 | 0 | 1 |
| 0 | 0 | 0 | 0 | 1 |
| 0 | 0 | 0 | 0 | 1 |

FIG. 19(Cont.)

The CAUSALTRT Procedure

| Model Information | |
|---|---|
| Data Set | WORK.IMPORT |
| Distribution | Normal |
| Link Function | Identity |
| Estimation Method | REGADJ |
| Treatment Variable | pc_10as_100cs_60 |
| Outcome Variable | MatureNodules |

| | |
|---|---|
| Number of Observations Read | 40 |
| Number of Observations Used | 40 |

| Class Level Information | | |
|---|---|---|
| Class | Levels | Values |
| pc_10as_100cs_60 | 2 | 1 0 |
| Replication | 2 | 1 2 |
| Strain | 4 | Anabaena_circinalis Anabaena_variabilis Frankia_alni Not Treated |

| Treatment Profile | | |
|---|---|---|
| Ordered Value | pc_10as_100cs_60 | Total Frequency |
| 1 | 1 | 10 |
| 2 | 0 | 30 |

PROC CAUSALTRT is modeling the probability that pc_10as_100cs_60='1'.

The CAUSALTRT Procedure

| Analysis of Causal Effect | | | | | | | |
|---|---|---|---|---|---|---|---|
| Parameter | Treatment Level | Estimate | Robust Std Err | Wald 95% Confidence Limits | | Z | Pr > |Z| |
| POM | 1 | 625.60 | 75.9570 | 476.73 | 774.47 | 8.24 | <.0001 |
| POM | 0 | 530.45 | 39.7649 | 452.51 | 608.39 | 13.34 | <.0001 |
| ATE | | 95.1500 | 85.8063 | -73.0272 | 263.33 | 1.11 | 0.2675 |

FIG. 20

METHOD TO INCREASE DISCOVERY PIPELINE HIT RATES AND LAB TO FIELD TRANSLATION

CROSS REFERENCE TO RELATED APPLICATIONS

This application claims the benefit of priority under 35 U.S.C. § 119(e) to U.S. Provisional Patent Application No. 63/118,526 filed on Nov. 25, 2020, and to U.S. Provisional Patent Application No. 63/089,670 filed on Oct. 9, 2020, the entirety of each of which is hereby incorporated by reference herein.

TECHNICAL FIELD

The present disclosure relates to the application of data integration, data analysis, and artificial intelligence. More specifically, but not by way of limitation, this disclosure relates to the application of data integration, data analysis, and artificial intelligence to increase the size and quality of discovery platforms.

BACKGROUND

Companies are incentivized to discover new compounds or biological actives. However, discovery pipelines require successive complex decisions amid uncertainty, and discoveries are often unsuccessful due to unseen efficacy, safety or regulatory limitations. Translating the lab effect to the field effect by applying data integration, data analysis, and artificial intelligence is needed to increase the size and quality of discovery platforms.

SUMMARY

In an example embodiment, a system comprises a data processor associated with a computing device and a non-transitory computer-readable storage medium. The non-transitory computer-readable storage medium comprises instructions that are executable by the data processor for causing the computing device to perform operations. The computing device transforms lab data and field data into a first format suitable for execution with a supervised machine learning model. The computing device executes the supervised machine learning model on the transformed lab data and field data to determine an input variable importance for a first set of input variables in predicting a field outcome. Based on determining the input variable importance for the first set of input variables in predicting the field outcome, the computing device generates one or more logical rules of decision metrics. The computing device selects the one or more input variables from the first set of input variables that yields a higher input variable importance for the one or more logical rules of decision metrics. Based on selecting the one or more input variables from the first set of input variables that yields a higher input variable importance for the one or more logical rules of decision metrics, the computing device generates one or more pass-fail indicators for the one or more selected input variables. The computing device combines the one or more pass-fail indicators for the one or more selected input variables. Based on the combination of the one or more pass-fail indicators for the one or more selected input variables, the computing device generates one or more prediction factor rules. The computing device transforms the field data and the one or more prediction factor rules into a second format suitable for execution with a statistical model. The computing device executes the statistical model on the transformed field data and the one or more prediction factor rules to determine a treatment effect for the one or more prediction factor rules. The computing device outputs the treatment effect for the one or more prediction factor rules. The computing device selects the prediction factor rule that maximizes the treatment effect.

In an exemplary alternative embodiment, the system comprises the non-transitory computer-readable storage medium with instructions to determine whether the machine learning model is a trained supervised machine learning model prior to executing the supervised machine learning. The system comprises the non-transitory computer-readable storage medium with instructions to train the supervised machine learning model based on determining that the supervised machine learning model is an untrained supervised machine learning model. The system comprises the non-transitory computer-readable storage medium with instructions for training the supervised machine learning model that includes training a plurality of random forests with in-bag fraction data and a random seed for the transformed lab data and field data. The non-transitory computer-readable storage medium comprises instructions to validate an out-of-bag fraction of the transformed data to score the out-of-bag fraction of the transformed data to determine results for the input variable importance and average the results for the input variable importance. For the system, each random forest of the plurality of random forests is unique, each out-of-bag fraction of data is unique, and/or each random seed is unique. The system comprises the supervised machine learning model that can include a random forest model, a neural network model, a gradient boost model, a Bayesian model, an ensemble model comprising multiple machine learning models, or a champion model selected from multiple machine learning and statistical models.

In another exemplary alternative embodiment, the system comprises the computing device for displaying the input variable importance for the first set of input variables in a graphical user interface.

In another exemplary alternative embodiment, the system comprises the combination of the one or more pass-fail indicators for the one or more selected input variables by combining the one or more pass-fail indicators for the one or more selected input variables.

In another exemplary alternative embodiment, the system comprises executing the statistical model by employing inferential statistics, causal inference, Bayesian procedures, regressions, linear models, nonlinear models, or probabilistic graphical methods to quantify the one or more prediction factor rules within a range of uncertainty.

In another exemplary alternative embodiment, the system comprises executing the statistical model by quantifying the one or more prediction factor rules within a range of uncertainty by estimating respective treatment effects or effects of compounds.

In another exemplary alternative embodiment, the system comprises the transformation of the lab data and the field data into the first format that causes the computing device to transpose the lab data, output the transposed lab data, join the transposed lab data and the field data, and output the joined transposed lab data and the field data.

In another exemplary alternative embodiment, the system comprises the transformation of the field data and the one or more prediction factor rules into the second format that causes the computing device to join the field data and the one or more prediction factor rules and output the joined field data and the one or more prediction factor rules.

In another exemplary alternative embodiment, a method is provided for transforming, by a computing device, lab data and field data into a first format suitable for execution with a supervised machine learning model. The method can include executing, by the computing device, the supervised machine learning model on the transformed lab data and field data to determine an input variable importance for a first set of input variables in predicting a field outcome. Based on determining the input variable importance for the first set of input variables in predicting the field outcome, the method can include generating, by the computing device, one or more logical rules of decision metrics. The method can include selecting, by the computing device, the one or more input variables from the first set of input variables that yields a higher input variable importance for the one or more logical rules of decision metrics. Based on selecting the one or more input variables from the first set of input variables that yields a higher input variable importance for the one or more logical rules of decision metrics, the method can include generating, by the computing device, one or more pass-fail indicators for the one or more selected input variables. The method can include combining, by the computing device, the one or more pass-fail indicators for the one or more selected input variables. Based on the combination of the one or more pass-fail indicators for the one or more selected input variables, the method can include generating, by the computing device, one or more prediction factor rules. The method can include transforming, by the computing device, the field data and the one or more prediction factor rules into a second format suitable for execution with a statistical model. The method can include executing, by the computing device, the statistical model on the transformed field data and the one or more prediction factor rules to determine a treatment effect for the one or more prediction factor rules. The method can include outputting, by the computing device, the treatment effect for the one or more prediction factor rules. The method can include selecting, by the computing device, the prediction factor rule that maximizes the treatment effect.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The specification makes reference to the following appended figures, in which use of like reference numerals in different figures is intended to illustrate like or analogous components.

FIG. 3F is an example flow diagram for executing statistical model on transformed field data and prediction factor rules and selecting the prediction factor rule that maximizes treatment effect, according to certain aspects of the present disclosure.

FIG. 4 is an example table of lab data, according to certain aspects of the present disclosure.

FIG. 5 is an example table of transformed lab data, according to certain aspects of the present disclosure.

FIG. 6 is an example table of field data, according to certain aspects of the present disclosure.

FIG. 7 is an example table of transformed lab data and field data for executing a supervised machine learning model, according to certain aspects of the present disclosure.

FIG. 17 is an example graphical user interface for combining pass-fail indicators for selected input variables, according to certain aspects of the present disclosure.

FIG. 18 is an example table for generating prediction factor rules, according to certain aspects of the present disclosure.

FIG. 19 is an example table for transforming the field data and prediction factor rules for execution with a statistical model, according to certain aspects of the present disclosure.

FIG. 20 is an example graphical user interface for executing the statistical model on the transformed field data and prediction factor rules to determine a treatment effect for the prediction factor rules and for outputting the treatment effect for the prediction factor rules, according to certain aspects of the present disclosure.

DETAILED DESCRIPTION

Figure 1:
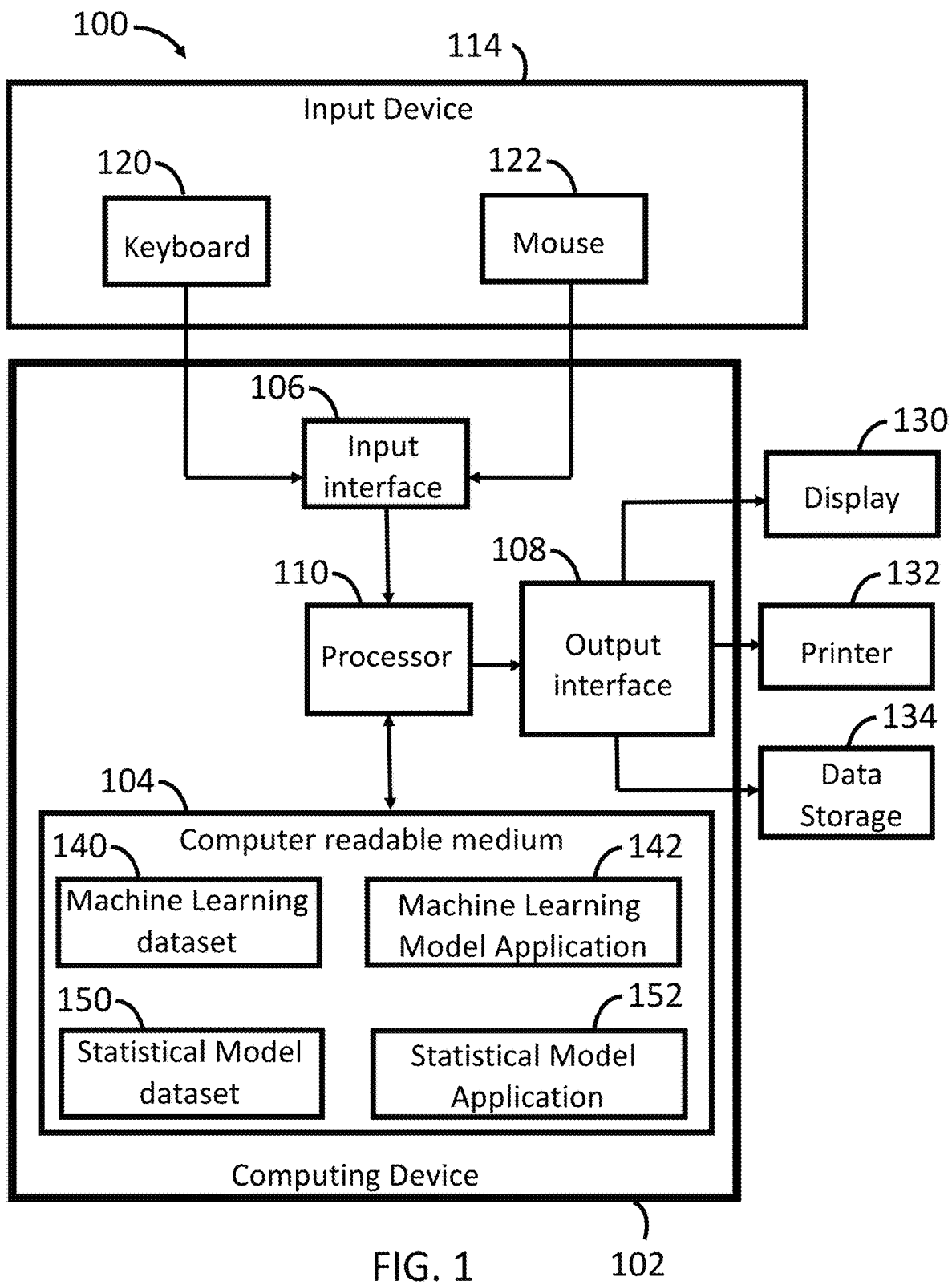
FIG. 1 is an example block diagram of a computer-implemented environment for executing a supervised machine learning model on a machine learning dataset and a statistical model on a statistical model dataset, according to certain aspects of the present disclosure.

In a traditional discovery pipeline or platform, companies may use a non-data-driven decision heuristic to identify new compounds or biological actives. Companies may also incorporate expert judgment along with the non-data-driven decision heuristic to further improve the success of identifying new compounds or biological actives. However, the companies' ability to predict the efficaciousness, safety, rate, or dosage of these new compounds or biological actives based on the non-data-driven decision heuristic is limited.

For example, an Agricultural Company may test new fungicides in a lab to determine if they inhibit the growth of fungus on a specific crop. The Agricultural Company may use an arbitrary heuristic rule to determine which fungicides should or should not be used in the field on the specific crop. Thus, the fungicides that meet the arbitrary heuristic rule are moved from the lab to the greenhouse to test their efficacy and then moved to field and applied to the specific crop. Fungicides that do not meet the arbitrary heuristic rule are discarded. However, the fungicides that are selected based on the arbitrary heuristic rule may not be effective in inhibiting the growth of fungus on the specific crop once they are applied in the field and fungicides that have been discarded may be effective in inhibiting the growth of fungus on the specific crop in the field.

In another example, a Pharmaceutical Company may test new drugs in a lab to determine if the drugs will treat or cure a disease or illness. The Pharmaceutical Company may also use an arbitrary heuristic rule to determine which drugs should or should not be used in clinical trials to cure the disease in patients. Thus, the drugs that meet the arbitrary heuristic rule are moved from the lab to clinical trials to test their efficacy, safety, and dosage responses and then to the general public. Drugs that do not meet the arbitrary heuristic rule are discarded. However, drugs that are selected based on the arbitrary heuristic rule may not be effective in curing the disease and drugs that have been discarded may in fact cure the disease.

In another example, a Manufacturing Company may develop lab-scale, pilot or prototype manufacturing processes to determine if the processes can be translated into industrial-scale manufacture. The Manufacturing Company may also use an arbitrary heuristic rule to determine which processes should or should not be used in industrial manufacture. Thus, the processes that meet the arbitrary heuristic rule are moved from the pilot plant to industrial settings to appropriate yield, quality, and throughput of the manufactured item. Processes that do not meet the arbitrary heuristic rule are discarded. However, processes that are selected based on the arbitrary heuristic rule may not generate optimal yield, quality, or throughput and processes that have been discarded may be better production methods than the selected process.

Translating the lab effect of new compounds and biological actives to the field effect by applying data integration, data analysis, and artificial intelligence increases the predictiveness of the field outcome of these compounds and biological actives, increases the true hit rate of these compounds and biological actives, or increases the efficiency of screening pipelines such that intermediate testing that may include formulation stability, phytotoxicity, or greenhouse tests can be skipped, deemphasized, or more tightly selected for. The secondary effects of translation may include reduced cost or reduced time to market, which can sometimes significantly improve the discovery pipeline's value. The lab-to-field translation method provides increased accuracy over an arbitrary rule and a much faster time to identify an optimal rule than brute-force guessing-and-checking, where $(k-1)*11^k$ rules are generated, where k is the number of predictive input variables chosen. Conducting a brute force approach to identify the optimal rule on all original input variables (e.g., identifying the predictive input variables without the supervised machine learning model) would be computationally onerous and infeasible.

Certain aspects and features of the present disclosure relate to lab to field translation to increase discovery pipeline hit rates. For example, a computing device can transform lab data and field data into a first format suitable for execution with a supervised machine learning model. Lab data may refer to data that is collected from experiments conducted in highly controlled laboratory conditions. This is commonly done as a first step in many forms of testing. The tight standards under which these tests are run differ greatly from the conditions seen in the field, which may be referred to as field data. Field data may comprise many additional sources of variability (e.g., weather, location) for an agricultural trial. In the agricultural trial, "field data" may include a field of crops, a sphere of practical operation outside a base (e.g., a laboratory, office, factory), etc. The transformation of the lab data and field data may include any trial that may have a difference in control of test conditions between an original run of a compound, treatment, or method during prototyping and an implementation in tests that incorporate field variability. The computing device can execute the supervised machine learning model on the transformed lab data and field data to determine an input variable importance for a first set of input variables in predicting a field outcome. The input variable importance is the contribution an input variable (e.g., a predictor) may have on the success of the supervised machine learning model. Success may include accuracy or precision. The most basic function of the supervised machine learning model is to model the factors that contribute to variation in predicting the field outcome for the first set of input variables. A good measure of the input variable importance may reveal important input variables from the first set of input variables. The better the field outcome prediction for the important input variables, the more closely the model may represent the field outcome and the more plausible it is that the important input variables may include the true cause of prediction. The input variable importance may identify the important input variables that represent the best field outcome prediction. Based on determining the input variable importance for the first set of input variables in predicting the field outcome, the computing device can generate one or more logical rules of decision metrics. The computing device can select the one or more input variables from the first set of input variables that yields a higher input variable importance for the one or more logical rules of decision metrics. Based on selecting the one or more input variables from the first set of input variables that yields a higher input variable importance for the one or more logical rules of decision metrics, the computing device can generate one or more pass-fail indicators for the one or more selected input variables. The computing device can combine the one or more pass-fail indicators for the one or more selected input variables. Based on the combination of the one or more pass-fail indicators for the one or more selected input variables, the computing device can generate one or more prediction factor rules. The computing device can transform the field data and the one or more prediction factor rules into a second format suitable for execution with a statistical model. The computing device can execute the statistical model on the transformed field data and the one or more prediction factor rules to determine a treatment effect for the one or more prediction factor rules. The computing device can output the treatment effect for the one or more prediction factor rules. The computing device can select the prediction factor rule that maximizes the treatment effect.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is an example block diagram of a computer-implemented environment 100 for executing a supervised machine learning model on a machine learning dataset and a statistical model on a statistical model dataset, according to certain aspects of the present disclosure. The computer-implemented environment 100 includes a computing device 102.

The computing device 102 has a computer-readable medium 104 and a processor 110. Computer-readable medium 104 is an electronic holding place or storage for information so the information can be accessed by processor 110. Computer-readable medium 104 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 110 executes instructions (e.g., stored at the computer readable medium 104). The instructions can be carried out by a special purpose computer, logic circuits, or hardware circuits. In one or more embodiments, processor 110 is implemented in hardware and/or firmware. Processor 110 executes an instruction, meaning it performs or controls the operations called for by that instruction. The term "execution" is the process of running an application or the carrying out of the operation called for by an instruction. The instructions can be written using one or more programming languages, scripting languages, assembly languages, etc. Processor 110 in one or more embodiments can retrieve a set of instructions from a permanent memory device and copy the instructions in an executable form to a temporary memory device that is generally some form of RAM, for example. Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal mitigation improvements, processing speed improvements, data communication speed improvements, and/or data efficiency targets and improvements throughout various parts of the system when compared to a homogeneous computing architecture that employs CPUs for general purpose computing.

In one or more embodiments computer-readable medium 104 stores instructions for execution by processor 110. For example, computer-readable medium 104 comprises a machine learning dataset 140, a machine learning model application 142, a statistical model dataset 150, and a statistical model application 152.

In one or more embodiments, the machine learning dataset 140 is transformed into a first format suitable for execution with the machine learning model application 142 to determine an input variable importance for a first set of input variables in predicting field outcome. The machine learning dataset 140 can include lab data 400 related to compounds or biological actives, genes, candidates, assays or discovery platforms, rates, assay-rate combinations, etc. Compounds or biological actives may include any substance that is biologically active, supporting a commercial purpose, whose practical application is intentional and mediated by humans. The compounds or biological actives may comprise elements, molecules, genetic material (e.g., DNA, RNA), peptides, proteins, microbial strains, or any combination of elements, molecules, genetic material (e.g., DNA, RNA), peptides, proteins, or microbial strains. Candidates may include compounds or biological actives that may be subjected to a test outside of their primary present commercial purpose. The test may comprise a laboratory trial, a greenhouse trial, a clinical trial, a field trial, any environment meant to test the efficacy or reproducibility of an effect, etc. Assays or discovery platforms may include controlled tests that determine the biological activity of compounds or biological actives. Assay-rate combinations may include compounds or biological actives that are tested across different test doses (e.g., dose rates). The machine learning dataset 140 can also include field data 600 related to various strains, compounds, genes, candidates, rates, field outcomes, etc. Field outcomes may include results of a field trial, which may involve a practical operation or application outside of a more controlled environment (e.g., a lab). The machine learning model application 142 can include, for example, a random forest model, a neural network model, a gradient boost model, a Bayesian model, an ensemble model comprising multiple machine learning models, a champion model selected from multiple machine learning and statistical models, etc.

In one or more embodiments, the statistical model dataset 150 is transformed into a second format suitable for execution with the statistical model application 152 to determine a treatment effect for the one or more prediction factor rules. The treatment effect may include a difference in the average outcome measurement between units assigned to a treatment profile and units assigned to a control profile. For example, the treatment effect may include an effect of candidates that passed the one or more prediction factor rules versus an effect of candidates that did not pass the one or more prediction factor rules. The statistical model dataset 150 can include field data 600 related to strains, compounds, genes, candidates, rates, field outcomes, etc. The statistical model dataset 150 can also include prediction factor rules related to one or more selected input variables that achieve one or more threshold activities in the lab. The prediction factor rules may include pass-fail indicators (e.g., yes-no, 0/1) for laboratory assays based on a permutation of laboratory assay threshold values. The final column 1802 of FIG. 18 includes an example of the pass-fail indicators. The one or more threshold activities may comprise cutoff percent inhibitions, percent disease control, etc. Cutoff percent inhibitions may include pass-fail indicators (e.g., 0/1) for different levels of inhibition for a disease in the lab. For example, an assay that experienced 15% disease inhibition would have the pass-fail indicator for 10% inhibition=1 and 20% inhibition=0. The percent disease control may include percent inhibition. The statistical model application 152 can comprise employing inferential statistics, causal inference, Bayesian procedures, regressions, linear models, nonlinear models, probabilistic graphical methods, etc. to quantify the one or more prediction factor rules within a range of uncertainty.

In one or more embodiments, one or more applications stored on computer-readable medium 104 are implemented in software (e.g., computer-readable and/or computer-executable instructions) stored in computer-readable medium 104 and accessible by processor 110 for execution of the instructions. The applications can be written using one or more programming languages, assembly languages, scripting languages, etc. The one or more applications can be integrated with other analytic tools. As an example, the machine learning dataset 140 and the machine learning model application 142 and the statistical model dataset 150 and the statistical model application 152 are integrated data analytics software applications and/or software architectures such as that offered by SAS Institute Inc. of Cary, N.C., USA. Merely for illustration, the applications are implemented using or integrated with one or more SAS software tools such as EVP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Visual Forecasting, SAS® Demand Planning, SAS® Visual Text Analytics, SAS® Natural Language Processing, and SAS/IML® all of which are developed and provided by SAS Institute Inc. of Cary, N.C., USA.

One or more applications stored on computer-readable medium 104 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 102. For instance, in one or more embodiments, computing device 102 further includes an input interface 106. Processor 110 operably couples with components of computing device 102 (e.g., input interface 106, with output interface 108 and with computer readable medium 104) to receive, to send, and to process information.

In one or more embodiments, the computing device 102 receives information from input device 114 via input interface 106. In one or more embodiments, the input device 114 is one or more devices for user entry (e.g., execute the supervised machine learning model on the transformed lab data and field data, execute the statistical model on the transformed field data and one or more prediction factor rules) into the computer-implemented environment 100. For instance, the input device 114 could include one or more of a mouse 122 or a keyboard 120. Alternatively or additionally, the input device 114 includes a display, a track ball, a keypad, a touchpad, one or more buttons, a sensor, a phone, a user selection mechanism, etc. For instance, a user executes the supervised machine learning model on the transformed lab data and field data or a user executes the statistical model on the transformed field data and one or more prediction factor rules with the computing device 102 (e.g., using mouse 122 or keyboard 120).

The computing device 102 outputs information to a display 130, printer 132, or data storage 134 via output interface 108. Output interface 108 provides an interface for outputting information (e.g., transformed lab data and field data, input variable importance for the first set of input variables, transformed field data and one or more prediction factor rules, treatment effect for the one or more prediction factor rules).

Figure 2A:
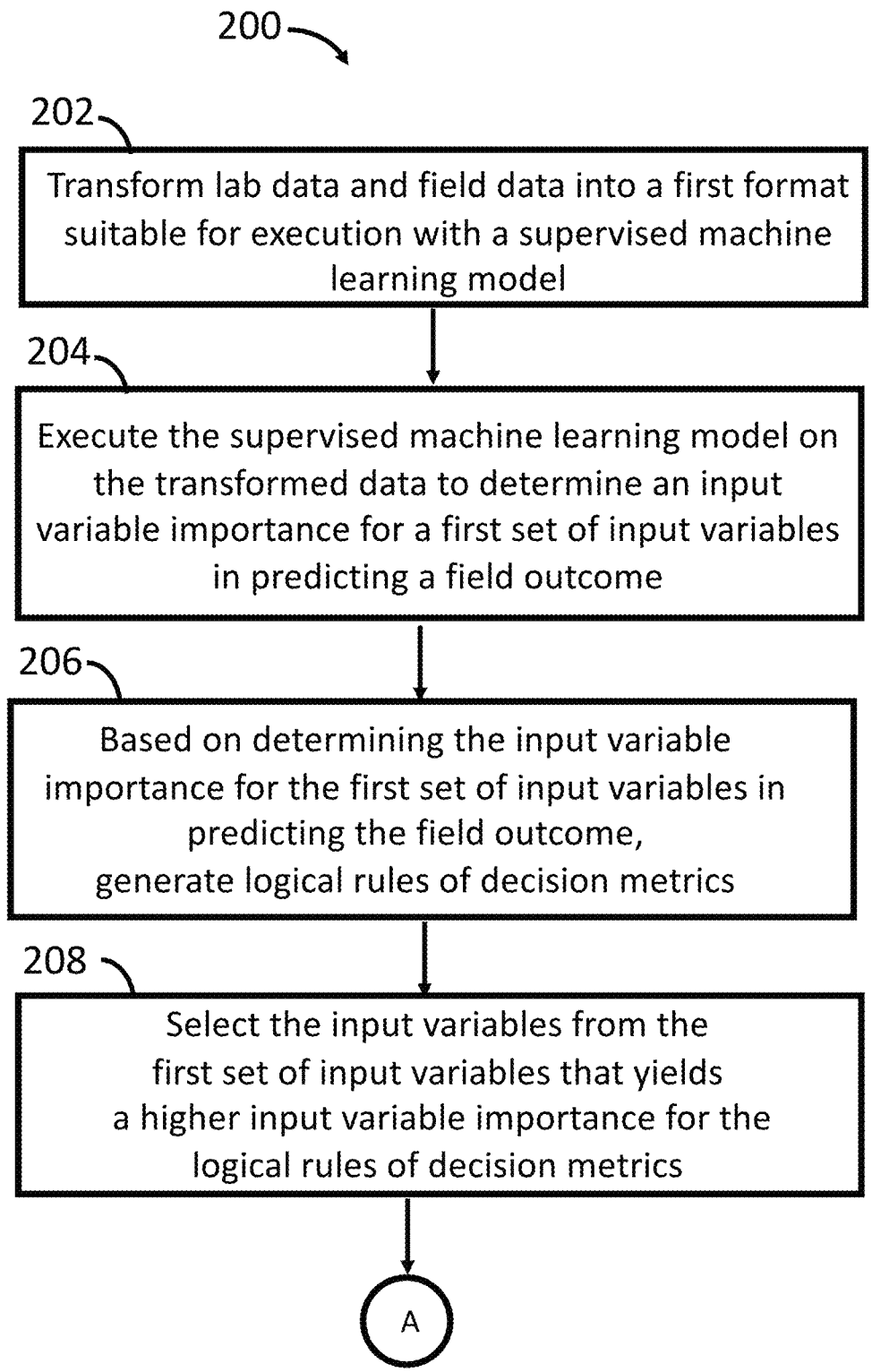
FIGS. 2A, 2B, and 2C are example flow diagrams for executing a supervised machine learning model on a machine learning dataset and a statistical model on a statistical model dataset, according to certain aspects of the present disclosure.
Figure 2B:
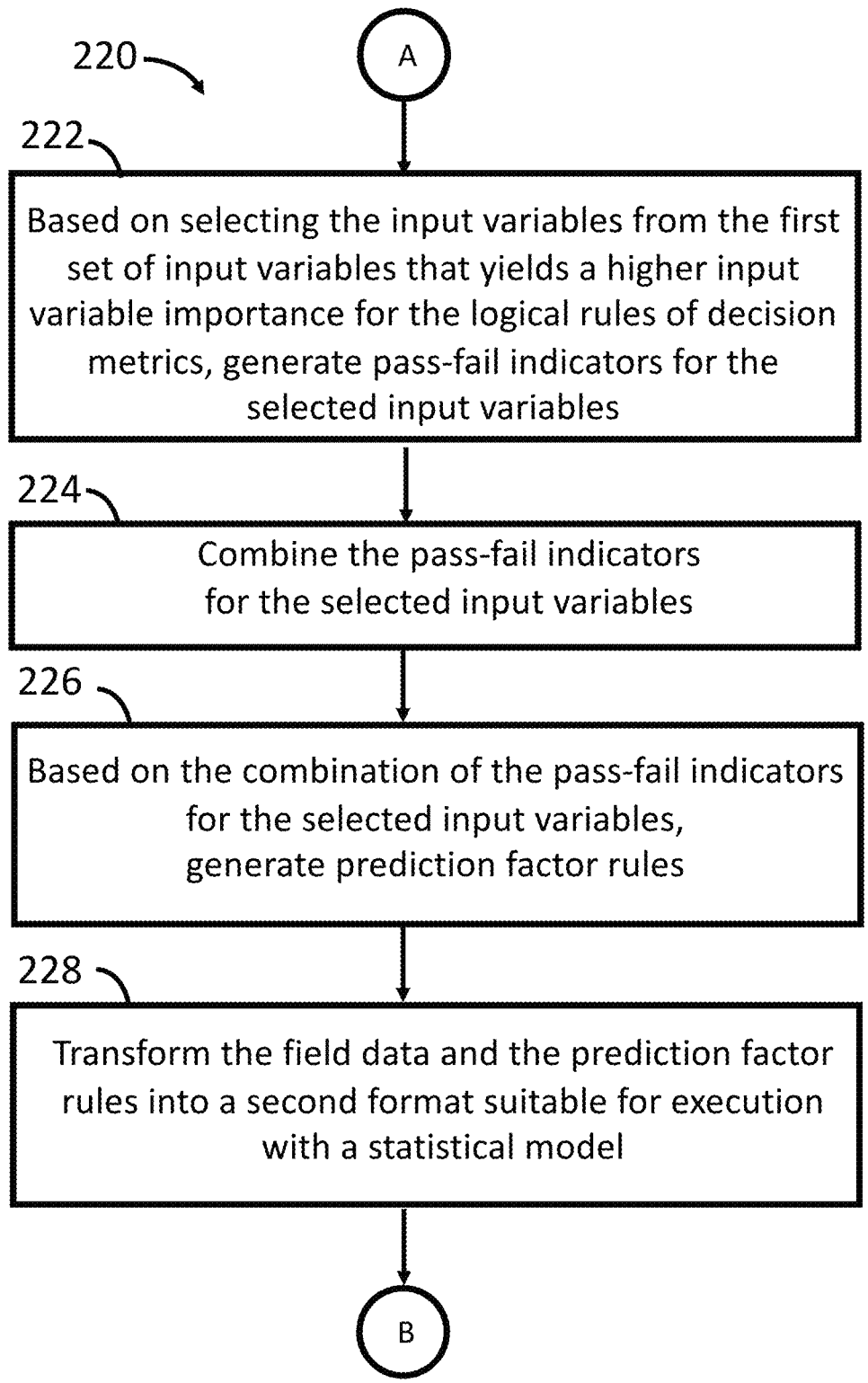
Figure 2C:
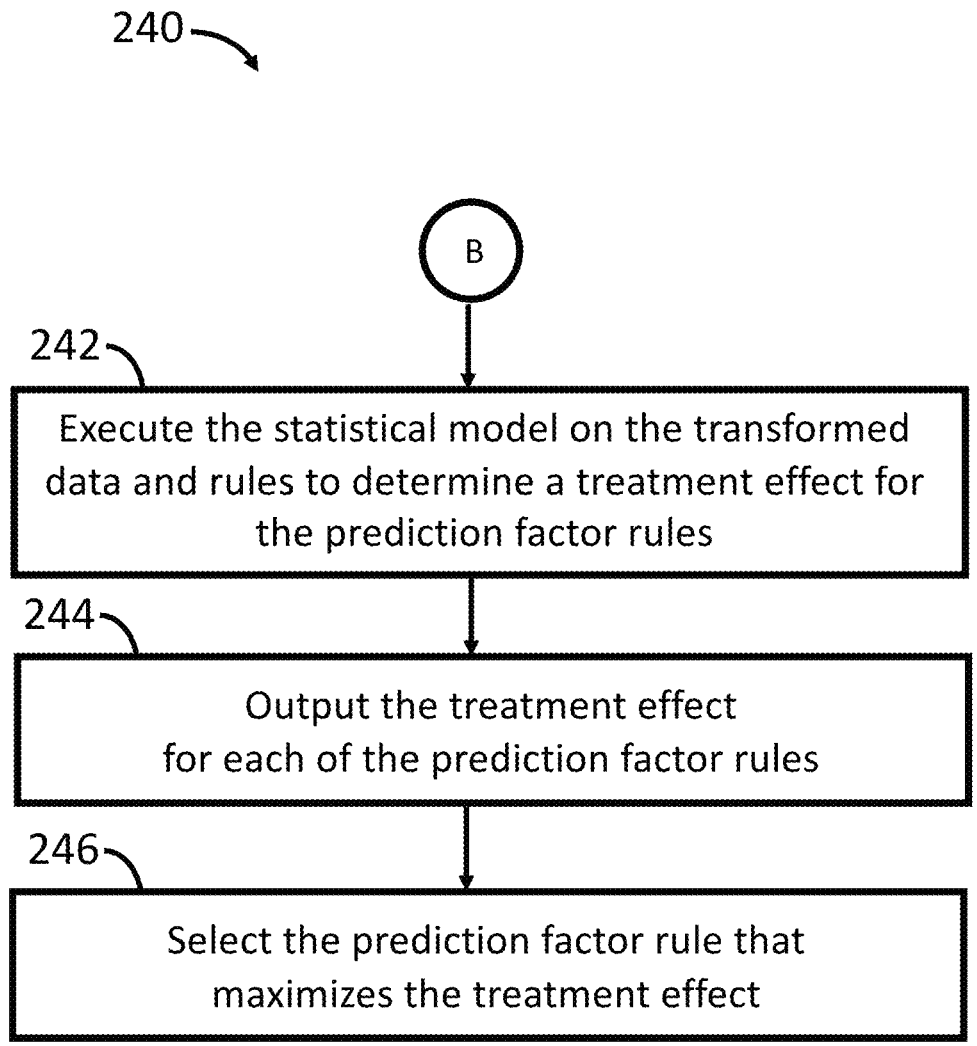

FIGS. 2A, 2B, and 2C are example flow diagrams for executing a supervised machine learning model on a machine learning dataset and a statistical model on a statistical model dataset, according to certain aspects of the present disclosure.

FIGS. 3A, 3B, 3C, 3D, 3E, and 3F are example flow diagrams that result in a prediction factor rule that maximizes treatment effect, which increases true field hits and/or decreases the frequency of lower performance compounds selected.

FIG. 4 is an example table of lab data, according to certain aspects of the present disclosure. Different compounds, strains, or other biological entities are tested across one or more assays, optionally at one or more rates (e.g., ppm, CFU/mL, etc.). Based on the testing, a user should decide which compounds, strains, or other biological entities to progress to later stage testing based on these early-stage testing results. In a traditional discovery pipeline or platform, these decisions encompass a non-data-driven decision heuristic that may also incorporate expert judgment.

Figure 3A:
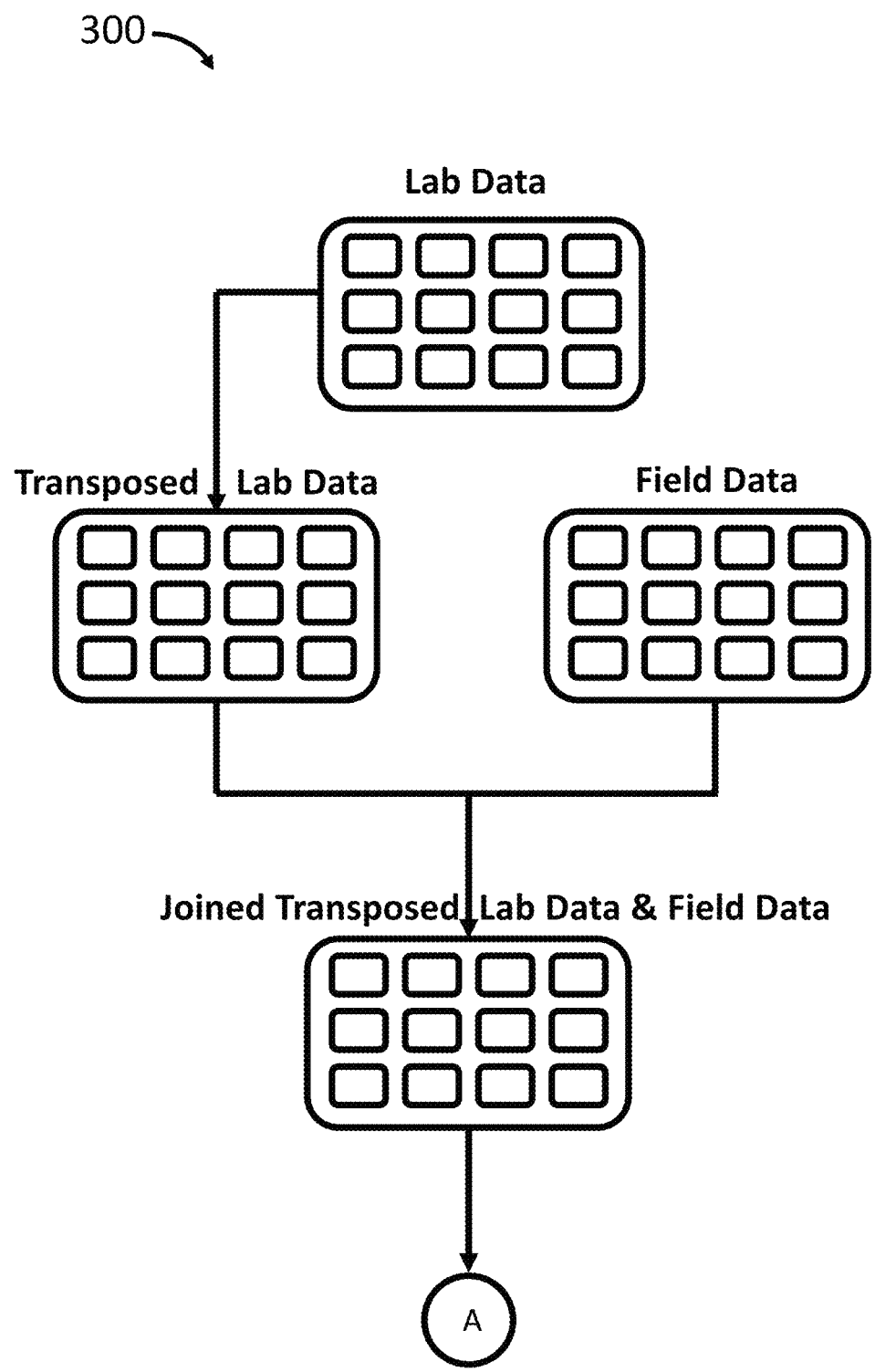
FIG. 3A is an example flow diagram for transforming lab data and field data for execution with a supervised machine learning model, according to certain aspects of the present disclosure.
Figure 8:
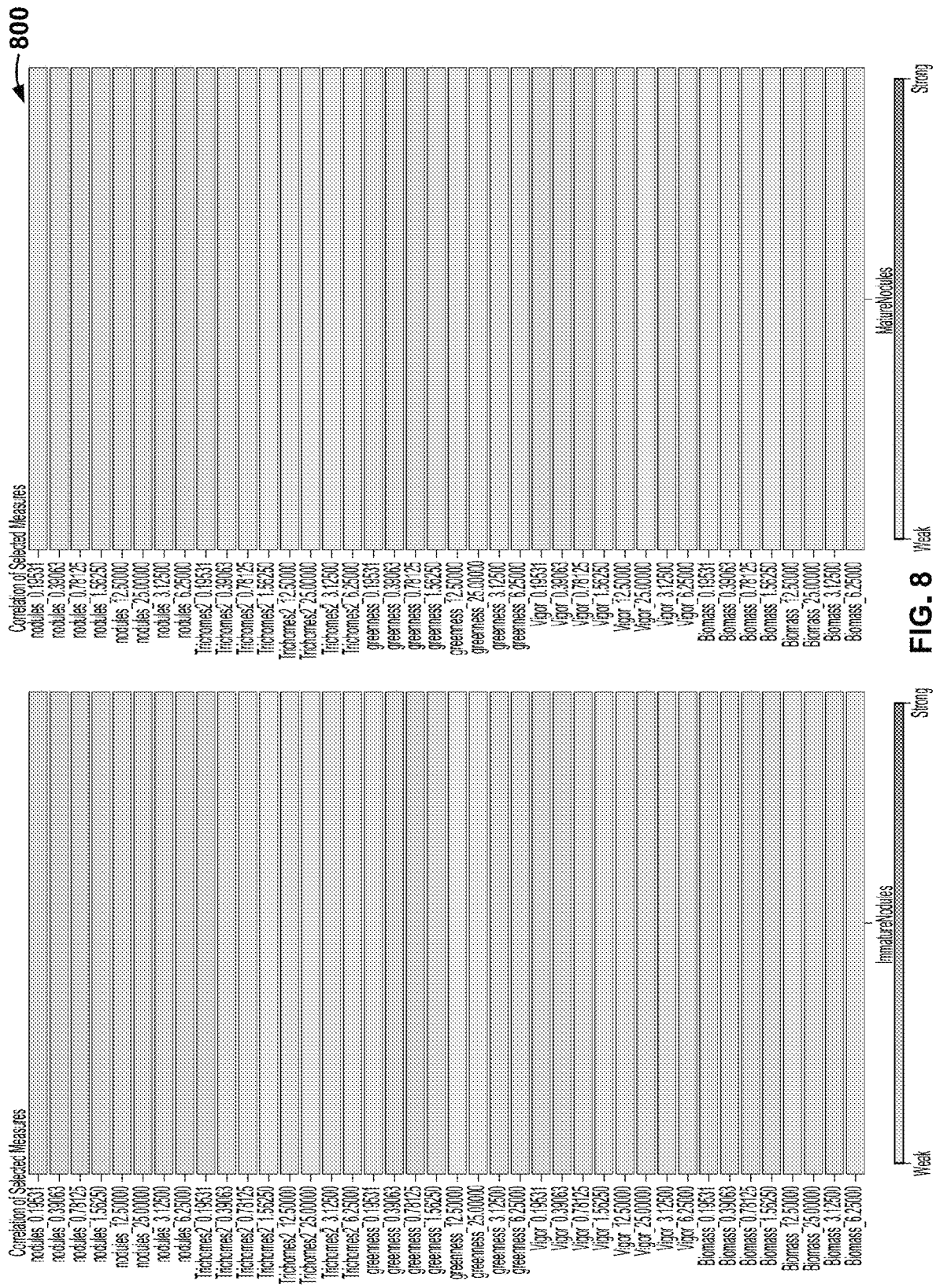
FIG. 8 is an example heat map correlation matrix of transformed lab data and field data for executing a supervised machine learning model, according to certain aspects of the present disclosure.

In block 202 of FIG. 2A and in flow diagram 300 of FIG. 3A, the computing device 102 may transform lab data 400 and field data 600 into a first format suitable for execution with a supervised machine learning model 142. For example, the computing device 102 may transform the lab data 400 and the field data 600 into the first format suitable for execution with the supervised machine learning model 142 by transposing the lab data 400, outputting the transposed lab data 500, joining the transposed lab data 500 and the field data 600, and outputting the joined transposed lab data and the field data 700. The transformation of the lab data 400 and the field data 600 into the first format may include merging or comparing the lab data and the field data by using any filter, aggregation, juxtaposition, append, transposition, batch processing, SQL action, etc. The lab data 400 may include one or more labels for a compound, a rate (e.g., parts per million (ppm)), colony forming units per milliliter (CFU/mL), or an assay (e.g., Assay A, Assay B, Assay C) in a first table. The lab data 400 may also include one or more compounds under the compound label, one or more rates for the one or more compounds under the rate label, and one or more percent inhibitions for one or more assays under the assay label for the one or more compounds at the one or more rates in the first table. For example, as shown in FIG. 4, three assays (e.g., Assay A, Assay B, Assay C) were run on a panel of compounds (e.g., XXX, YYY, ZZZ) and applied at one or more rates (e.g., 1, 2, 3 parts per million (PPM)). The numbers listed in the columns for Assay A, Assay B, and Assay C represent responses or outcomes of assay-rate combinations for each of the assays. Higher numbers in the columns for Assay A, Assay B, and Assay C represent a greater biological response or a higher activity in the lab for the panel of compounds. The lab data 400 can include the first table that shows a row 402 that includes compound XXX with 0.1 percent inhibition for Assay A, 0.1 percent inhibition for Assay B, and 0 percent inhibition for Assay C at a rate of 1 parts per million (PPM). Transposing the lab data 500 may include combining one or more assay names (e.g., nodules) with one or more rates (e.g., 0.19531, 0.39063) to represent the assay-rate combinations as a data item according to one or more strains, compounds, or other biological entities. This transposition facilitates testing the strains, compounds, or biological entities' responses across tests (e.g., across rates or replications). Transposing the lab data 500 may also comprise manipulating narrow and long lab data in the first table (e.g., many rows; few columns) into short and wide lab data in a second table (e.g., few rows; many columns). Outputting the transposed lab data 500 may include a second table that shows the one or more assay-rate combinations for the one or more strains, compounds, or other biological entities. For example, as shown in FIG. 5, the output for the transposed lab data 500 can include the second table that shows a row 502 that includes strain *Anabaena_circinalis* with 2.977701354 percent inhibition for nodules_0.19531 at a rate of 0.19531 PPM, 0 percent inhibition for nodules 0.39063 at a rate of 0.39063 PPM, 5.37468793 percent inhibition for nodules_0.78125 at a rate of 0.78125 PPM, and 0.472351682 percent inhibition for nodules_1.56250 at a rate of 1.56250 PPM. Joining the transposed lab data 500 and the field data 600 may include combining the one or more assay-rate combinations for the one or more strains in the second table and one or more field outcomes for the one or more strains in a third table. The field data 600 may include one or more labels for a strain, one or more labels for one or more rates, or one or more labels for one or more field outcomes. The field data 600 may include one or more strains under the strain label, one or more rates under the rate label, or one or more field outcomes for the one or more strains under the field outcome label in the third table. The field data 600, as shown in FIG. 6, can include the third table that shows a row 602 that includes strain *Anabaena_circinalis* under the strain label that has a field outcome of 16695 for ImmatureNodules and a field outcome of 12700 for MatureNodules at a rate of 1000 ppm. Immature Nodules and Mature Nodules may include measured field outcomes or responses from application of strains or other biological actives, optionally at one or more rates. The field test measures the desired outcome of biological actives identified during earlier controlled (lab) phases. ImmatureNodules and MatureNodules are the results of how each strain performs in the field. Thus, ImmatureNodules and MatureNodules are the target variables that the assay-rate combinations predict. Outputting the joined transposed lab data and the field data 700 may include a fourth table that shows one or more labels for one or more strains, one or more labels for one or more rates, one or more labels for one or more field outcomes, or one or more labels for one or more assay-rate combinations. Outputting the joined transposed lab data and the field data may also include the fourth table that shows the one or more strains under the strain label at one or more rates under the rate label for one or more field outcomes under the field outcome label or one or more assay-rate combinations under the assay-rate combination label. For example, as shown in FIG. 7, the output for the joined transposed lab data and the field data 700 can include the fourth table that shows a row 702 that includes strain *Anabaena_circinalis* under the strain label that has a field outcome of 16695 for ImmatureNodules and a field outcome of 12700 for MatureNodules with 2.977701354 percent inhibition for nodules_0.19531 and 0 percent inhibition for nodules_0.39063 at a rate of 1000 CFU/mL. As shown in FIG. 8, the output for the joined transposed lab data and the field data 700 can include a heat map correlation matrix 800 that shows the field outcomes ImmatureNodules and MatureNodules for five assays (e.g., nodules, Trichomes, greenness, Vigor, Biomass) at eight rates (e.g., 0.19531, 0.39063, 0.78125, 1.56250, 12.50000, 25.00000, 3.12500, 6.25000 ppm). A weak to strong axis represents strength of correlation ($r^2$). None of the individual assay-rate combinations (e.g., nodules_0.19531) correlate definitively with field outcomes ImmatureNodules or MatureNodules. The output provides a way to extract additional signal from the combination of assays, each of which is weakly predictive individually.

Figure 3B:
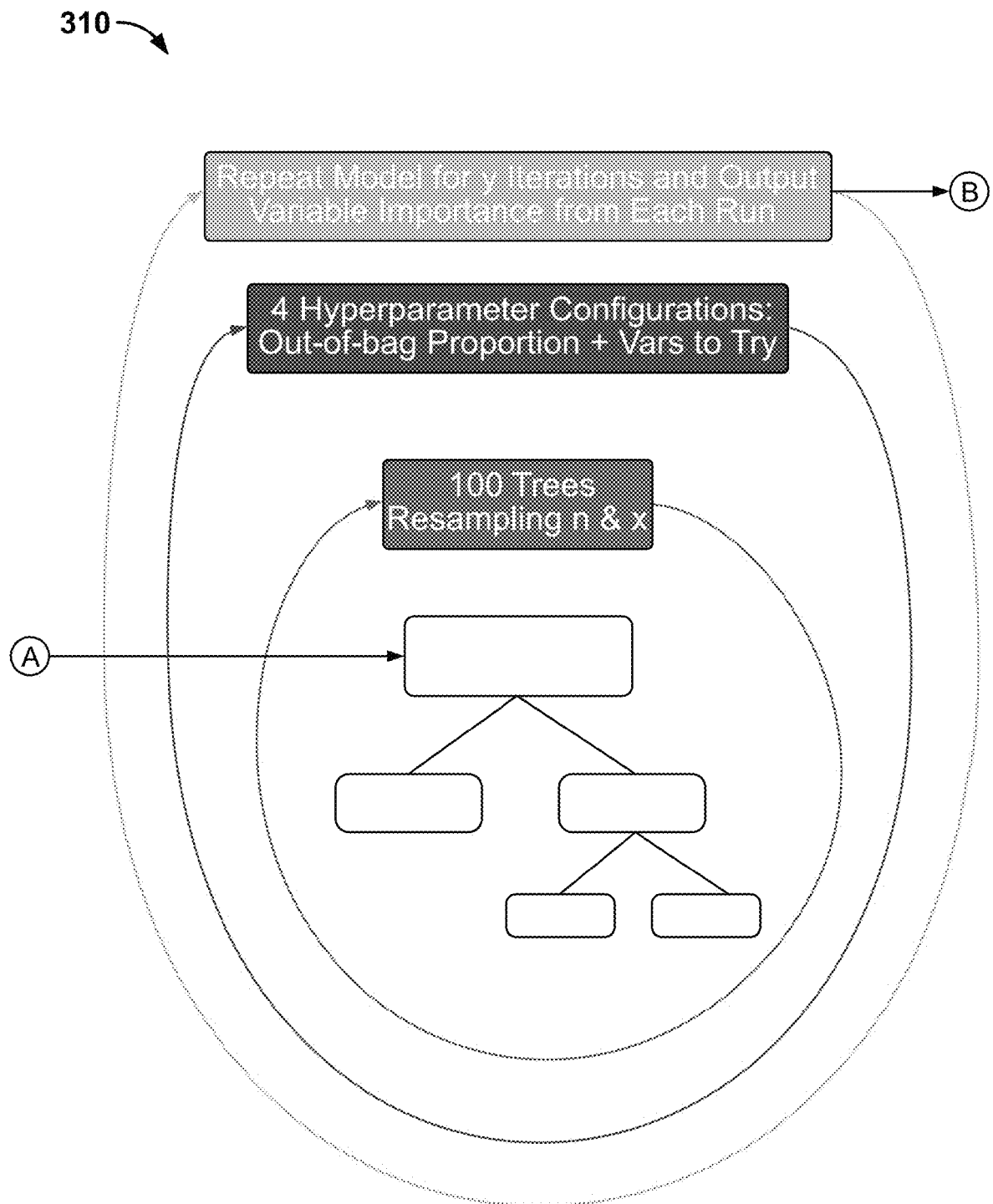
FIG. 3B is an example flow diagram for executing a supervised machine learning model on the transformed lab data and field data to determine input variable importance, according to certain aspects of the present disclosure.

In block 204 of FIG. 2A and in flow diagram 310 of FIG. 3B, the computing device 102 may execute the supervised machine learning model 142 on the transformed lab data 400 and field data 600 to determine an input variable importance for a first set of input variables in predicting a field outcome. Prior to executing the supervised machine learning model, the computing device may determine whether the machine learning model is a trained supervised machine learning model. Based on determining that the supervised machine learning model is an untrained supervised machine learning model, the computing device may train the supervised machine learning model. The supervised machine learning model can include a random forest model. Training the supervised machine learning model may comprise training a plurality of random forests with in-bag fraction and a random seed for the transformed lab data and field data, validating an out-of-bag fraction of the transformed data to score the out-of-bag fraction of the transformed data to determine results for the input variable importance, and averaging the results for the input variable importance. Each random forest of the plurality of random forests may be unique. Each out-of-bag fraction of data may be unique. Each random seed may be unique. For example, training a plurality of random forests with in-bag fraction and a random seed for the transformed lab data and field data can include training 500 random forests that are differed randomly by an in-bag fraction in the range of about 60 percent to 90 percent of the transformed data and by the random seed. Validating an out-of-bag fraction of the transformed data to score the out-of-bag proportion (e.g., out-of-bag fraction) of the transformed data to determine results for the input variable importance can include scoring the out-of-bag fraction in the range of about 10 percent to 40 percent of the transformed data to determine results for the input variable importance. For example, as shown in FIG. 3B, the random forest model may include a built-in parameter called out-of-bag fraction for repeated resampling of observations (e.g., n) and a built-in parameter called vars-to-try to change the number of input variables (e.g., x) that are selected to any given tree (e.g., 100 trees). The observations (e.g., n) are the rows of data representing individual entities in a dataset. The input variables (e.g., x) may include the assay-rate combinations shown in FIG. 7 (e.g., nodules_0.19531). The random forest model is repeated for y iterations (e.g., 500 iterations) with varying values for the out-of-bag fraction and the vars-to-try parameters to determine an input variable importance for a first set of input variables in predicting a field outcome. Averaging the results for the input variable importance can include averaging the input variable importance results from the 500 random forests. Each random forest of the 500 random forests may be unique in that different out-of-bag fractions and random seeds are used to distinguish the first set of input variables that show similar levels of variable importance for predicting the field outcome.

Figure 3C:
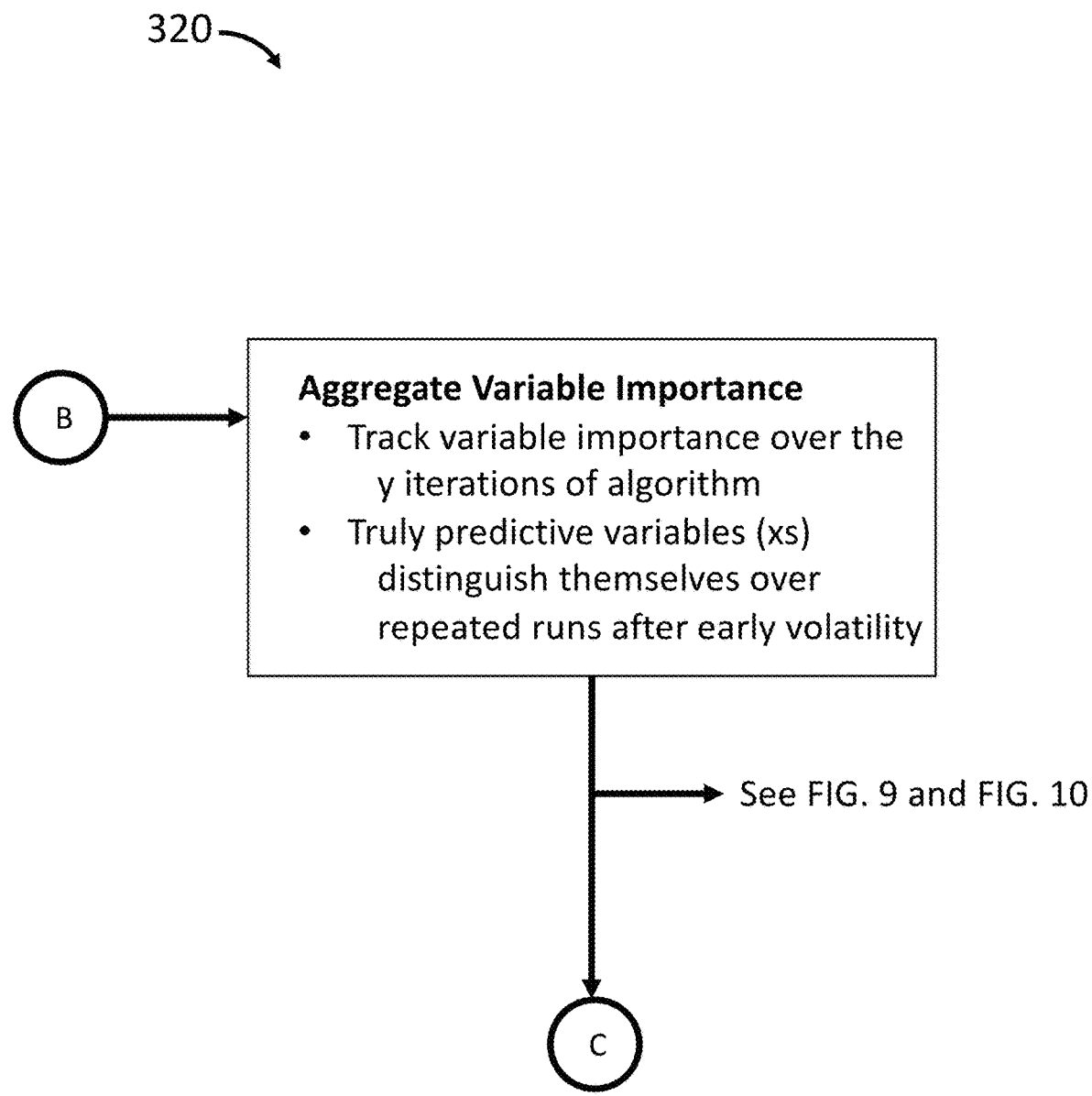
FIG. 3C is an example flow diagram for generating logical rules of decision metrics and for selecting input variables that yield higher input variable importance, according to certain aspects of the present disclosure.

In block 206 of FIG. 2A and in flow diagram 320 of FIG. 3C, the computing device 102 may generate one or more logical rules of decision metrics based on determining the input variable importance for the first set of input variables in predicting the field outcome. The generation of the one or more logical rules of decision metrics may include using the Random Branch Assignment (RBA) method which computes the importance of an input variable "v" by comparing how the data fit the predictions with how the data fit modified predictions. To modify the predictions, the random forest model replaces all splitting rules that use variable "v" by a rule that randomly assigns an observation to a branch. The probability of assigning an observation to a branch, P (branch), is proportional to the number of training observations that were assigned to the branch during construction of the model. The RBA importance can be expressed mathematically as $I_{RBA}(v) \propto \Sigma_{i=1}^n Loss(y_i, \ddot{y}_i) - \Sigma_{i=1}^n Loss(y_i, \hat{y}_i)$, where $\ddot{y}_i$ is the modified prediction for observation "i" and $\hat{y}_i$ is the standard prediction. For a target interval, the random forest model computes the RBA importance of square error loss and absolute error loss.

Figure 9:
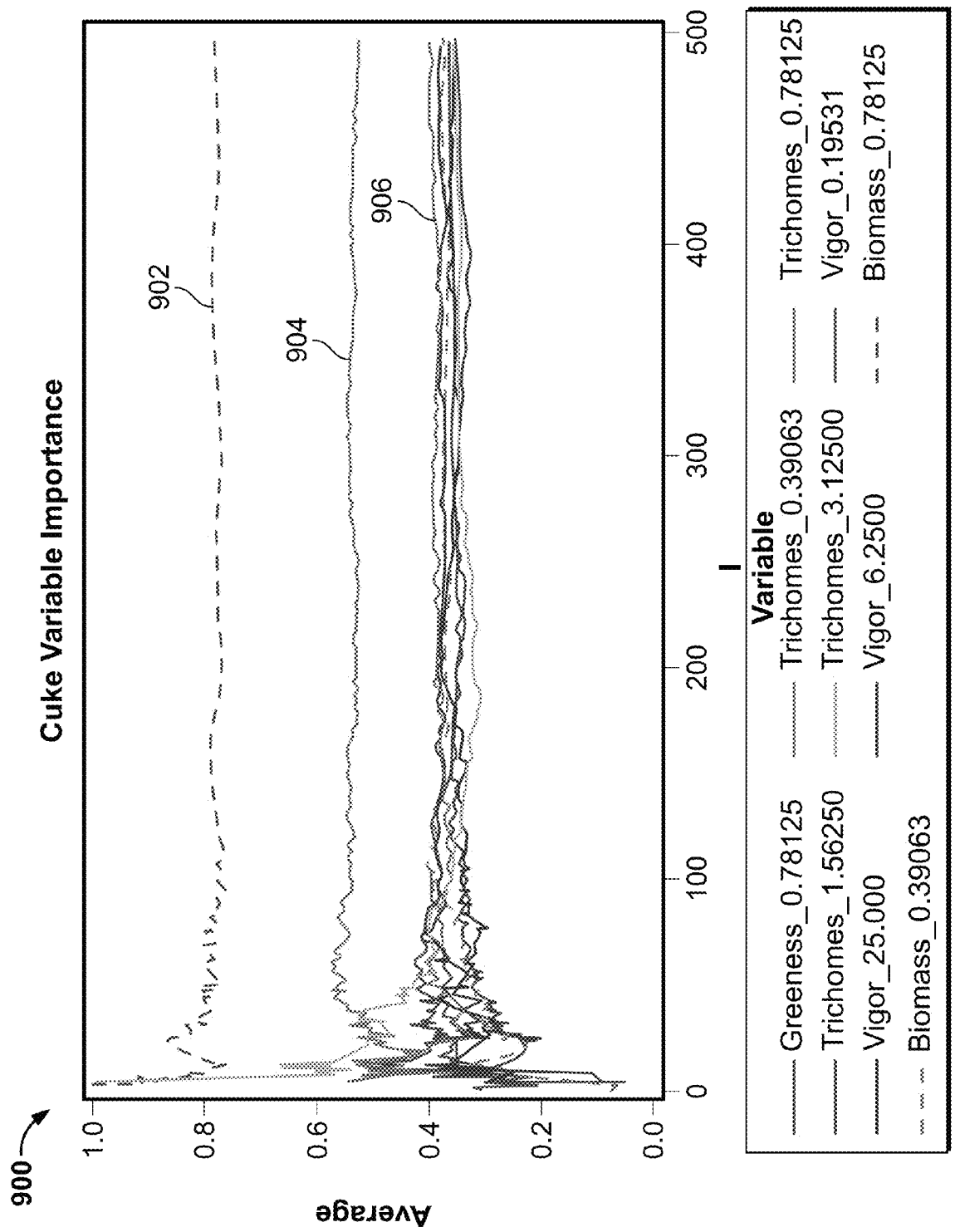
FIG. 9 and FIG. 10 are example graphical user interfaces for displaying input variable importance, according to certain aspects of the present disclosure.
Figure 10:
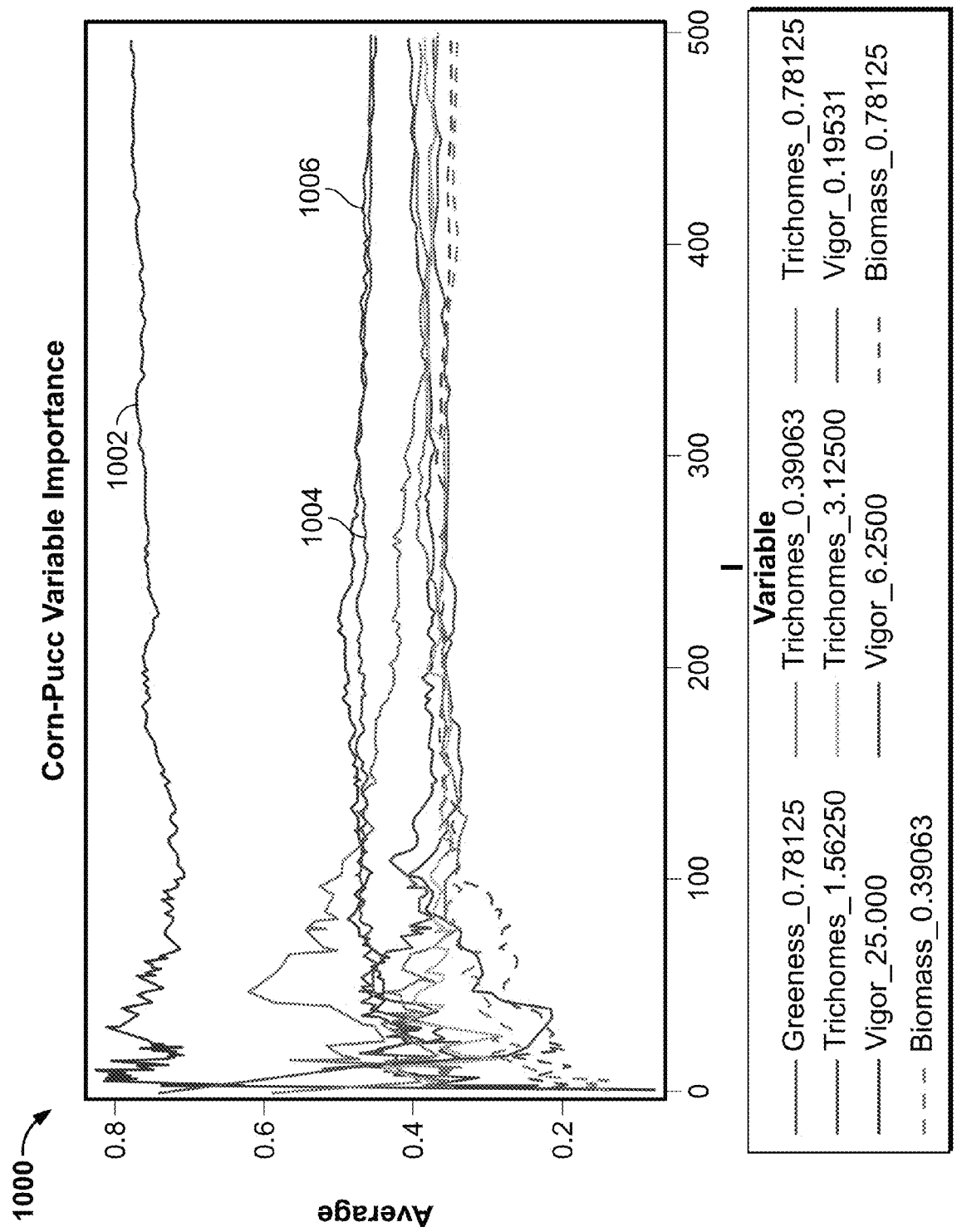

In block 208 of FIG. 2A and in flow diagram 320 of FIG. 3C, the computing device 102 may select the one or more input variables from the first set of input variables that yields a higher input variable importance for the one or more logical rules of decision metrics. The computing device displays the input variable importance for the first set of input variables in a graphical user interface. FIG. 9 and FIG. 10 are example graphical user interfaces for displaying input variable importance, according to certain aspects of the present disclosure. Each figure shows a moving average variable importance of each assay or assay-rate combination for a field outcome. The x axis represents 500 trees with random hyperparameter configurations and out-of-bag proportions (as shown in FIG. 3B). A user would rate or select the assays or assay-rate combinations according to one or more attributes of the moving average variable importance. For example, as shown in FIG. 9, the first set of input variables may include assay-rate combinations (e.g., Greeness_0.78125, Trichomes_0.39063, Trichomes_0.78125, Trichomes_1.56250, Trichomes_3.12500, Vigor_0.19531, Vigor_25.00000, Vigor_6.25000, Biomass_0.78125, Biomass_0.39063). The one or more logical rules of decision metrics may include an average (e.g., 0, 0.2, 0.4, 0.6, 0.8, 1.0) of the assay-rate combinations (e.g., Greeness_0.78125, Trichomes_0.39063, Trichomes_0.78125, Trichomes_1.56250, Trichomes_3.12500, Vigor_0.19531, Vigor_25.00000, Vigor_6.25000, Biomass_0.78125, Biomass_0.39063) for "i" iterations (e.g., 0, 100, 200, 300, 400, 500 iterations) of the random forest model that predict the field outcome Cuke as shown in the graphical user interface 900. The computing device may select the assay-rate combinations Biomass_0.78125 902, Trichomes_0.39063 904, and Trichomes_0.78125 906 that yield the higher input variable importance for predicting the field outcome Cuke. As shown in FIG. 10, the first set of input variables may include assay-rate combinations (e.g., Greeness_0.78125, Trichomes_0.39063, Trichomes_0.78125, Trichomes_1.56250, Trichomes_3.12500, Vigor_0.19531, Vigor_25.00000, Vigor_6.25000, Biomass_0.78125, Biomass_0.39063). The one or more logical rules of decision metrics may include an average (e.g., 0, 0.2, 0.4, 0.6, 0.8) of the assay-rate combinations (e.g., Greeness_0.78125, Trichomes_0.39063, Trichomes_0.78125, Trichomes_1.56250, Trichomes_3.12500, Vigor_0.19531, Vigor_25.00000, Vigor_6.25000, Biomass_0.78125, Biomass_0.39063) for "i" iterations (e.g., 0, 100, 200, 300, 400, 500 iterations) of the random forest model that predict the field outcome Corn-Pucc as shown in the graphical user interface 1000. The computing device may select the assay-rate combinations Vigor_25.00000 1002, Greeness_0.78125 1004, and Vigor_6.25000 1006 that yield the higher input variable importance for predicting the field outcome Corn-Pucc.

Figure 3D:
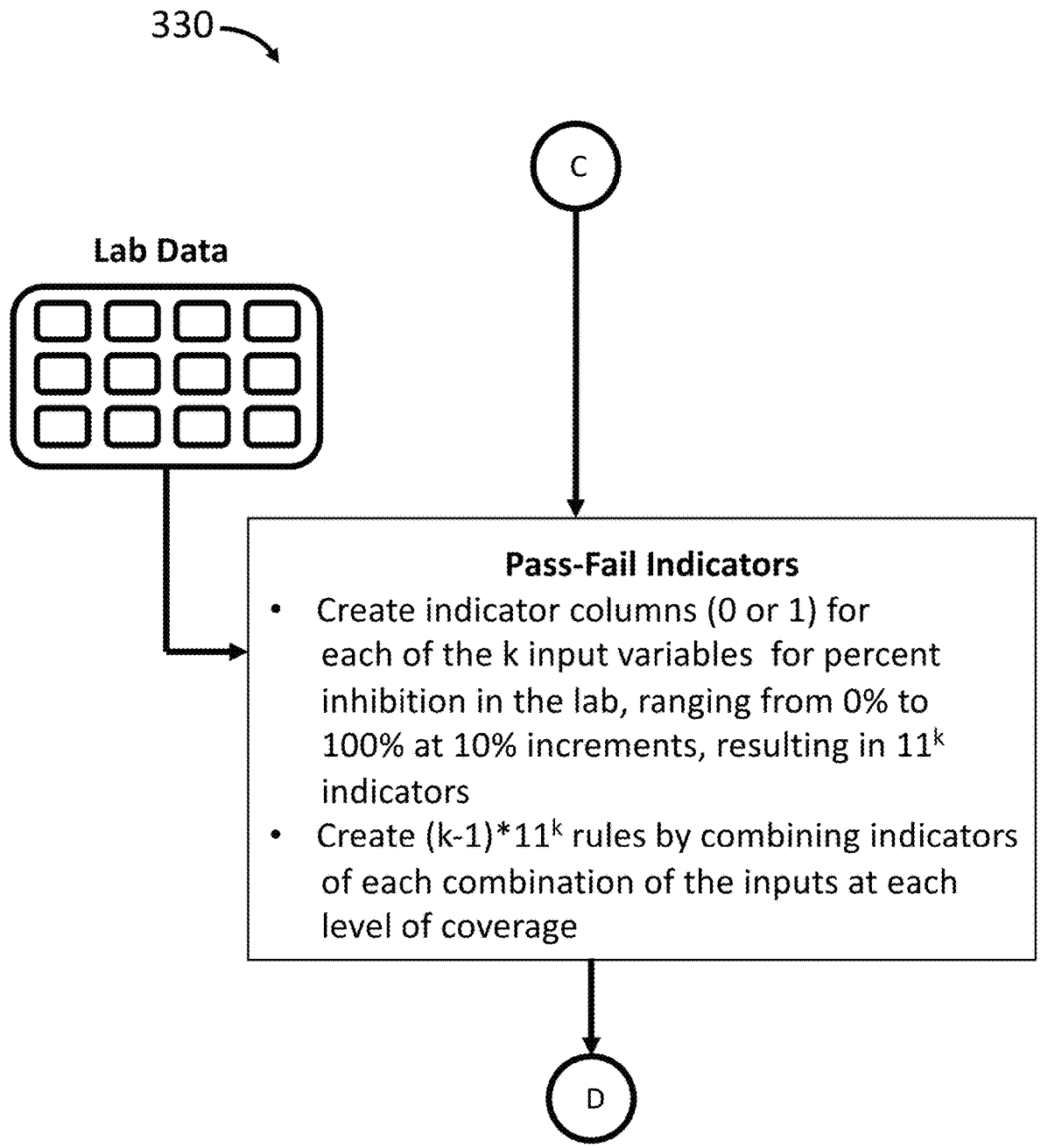
FIG. 3D is an example flow diagram for generating pass-fail indicators and for combining pass-fail indicators for selected input variables to generate prediction factor rules, according to certain aspects of the present disclosure.
Figure 11:
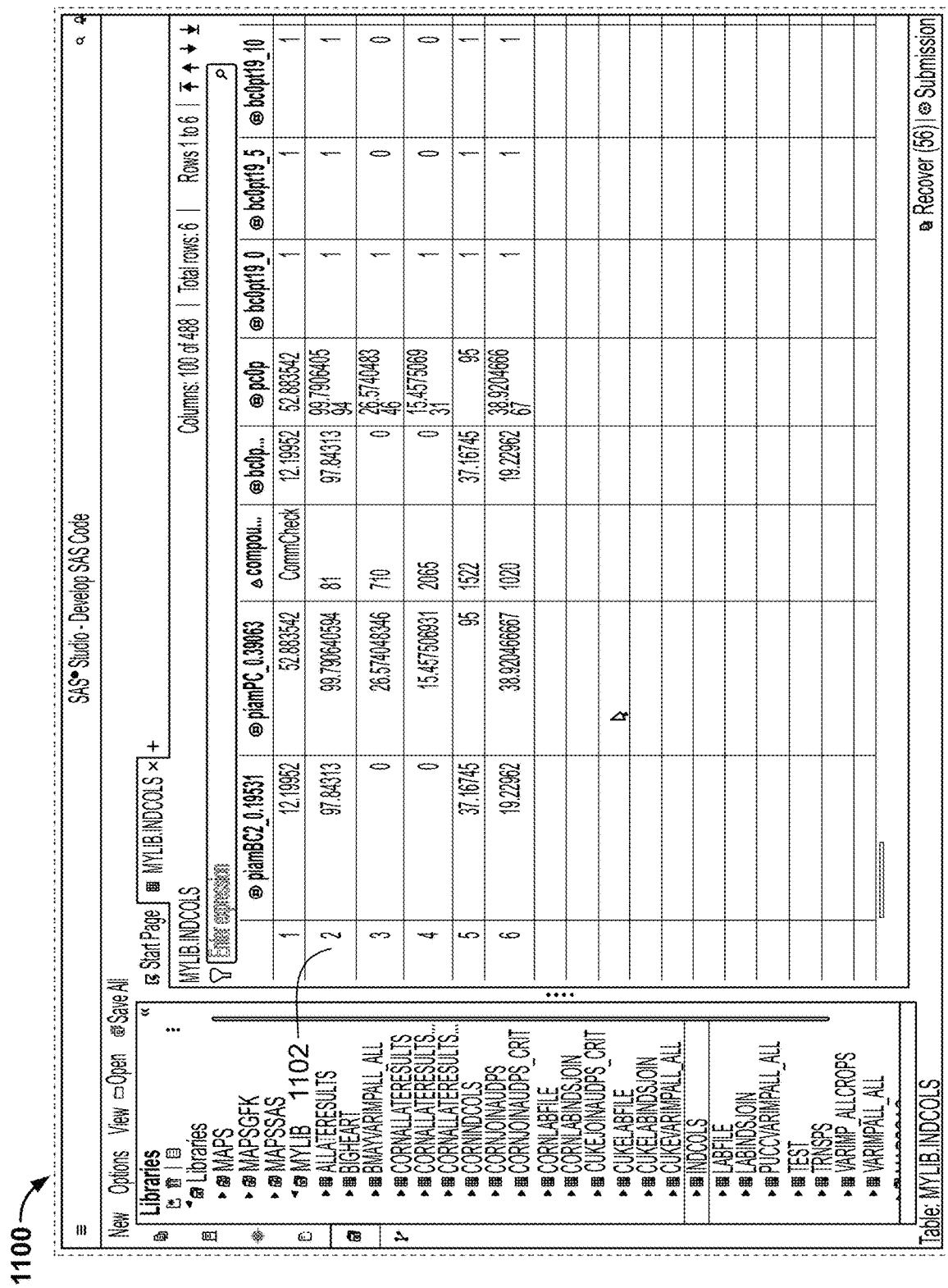
FIG. 11, FIG. 12, FIG. 13, FIG. 14, FIG. 15, and FIG. 16 are example graphical user interfaces for generating pass-fail indicators for selected input variables, according to certain aspects of the present disclosure.
Figure 12:
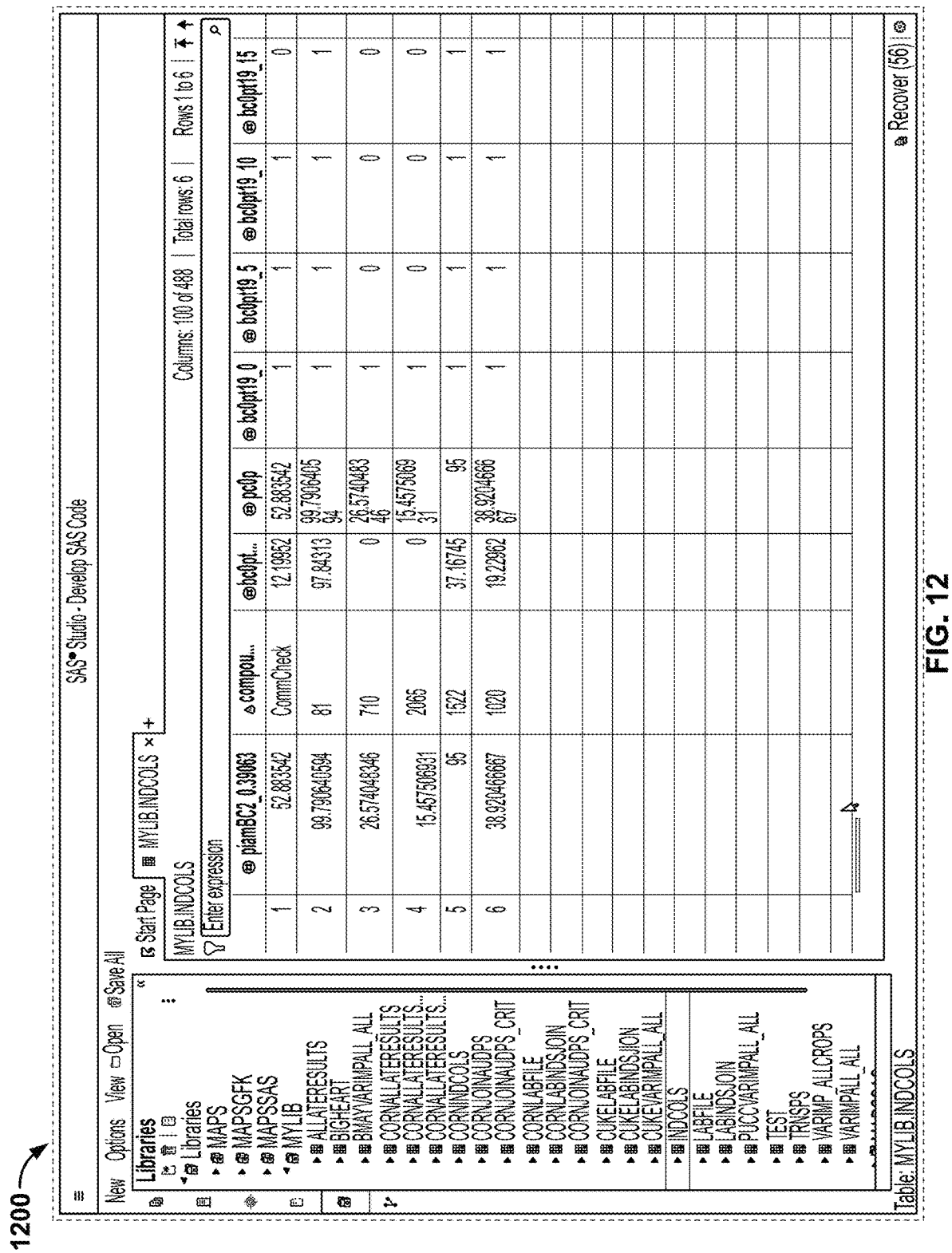
Figure 13:
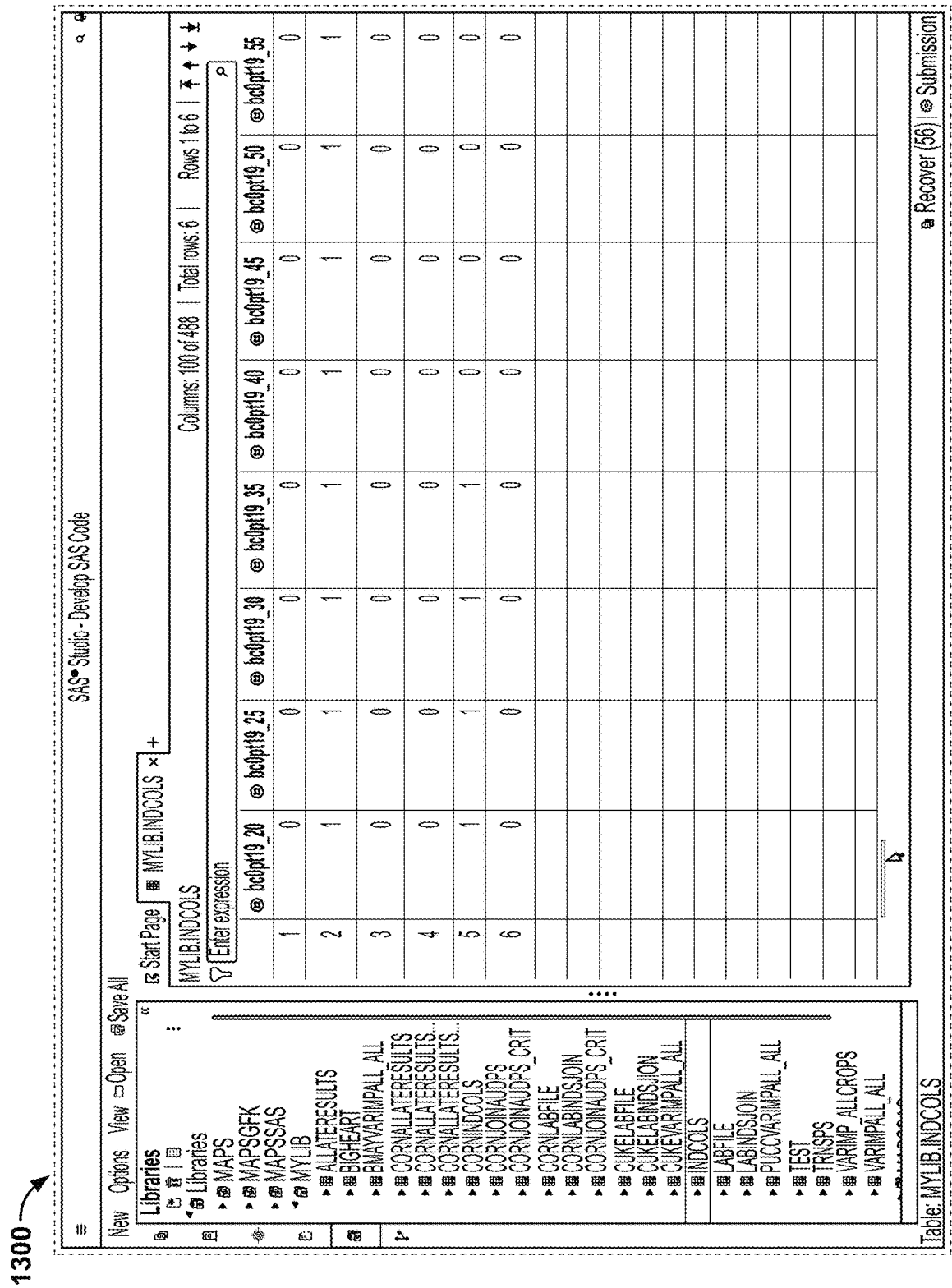
Figure 14:
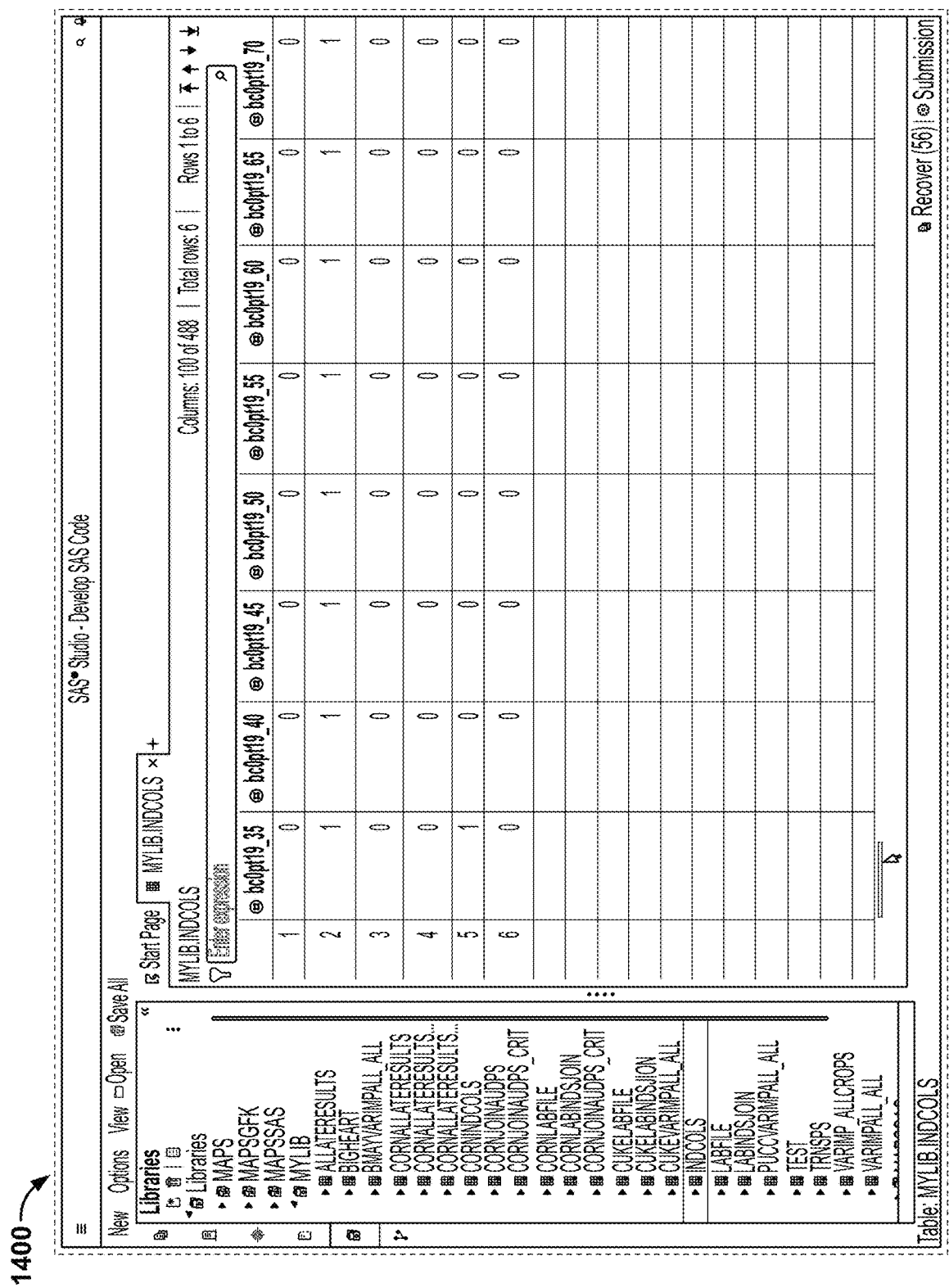
Figure 15:
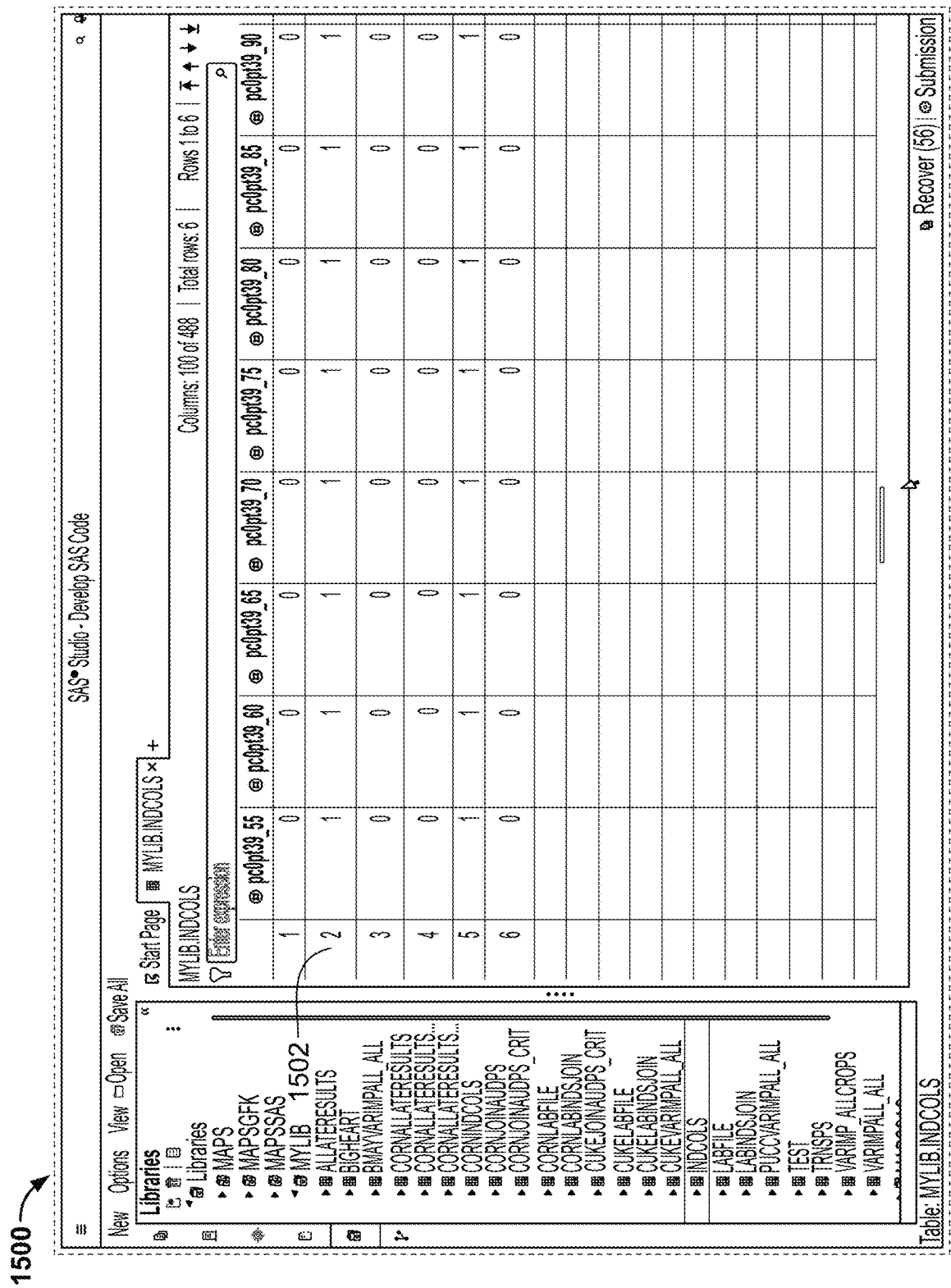
Figure 16:
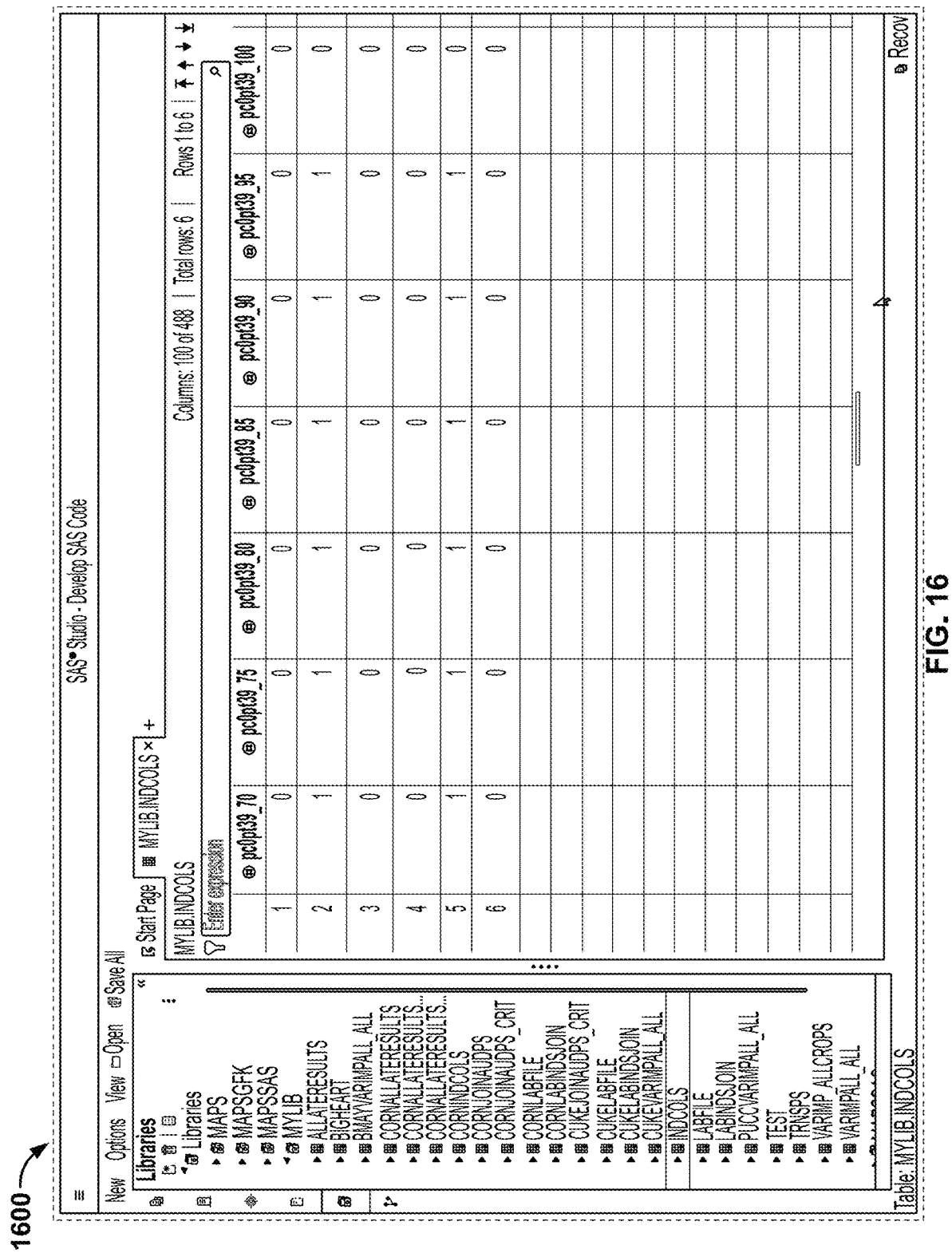
Figure 21:
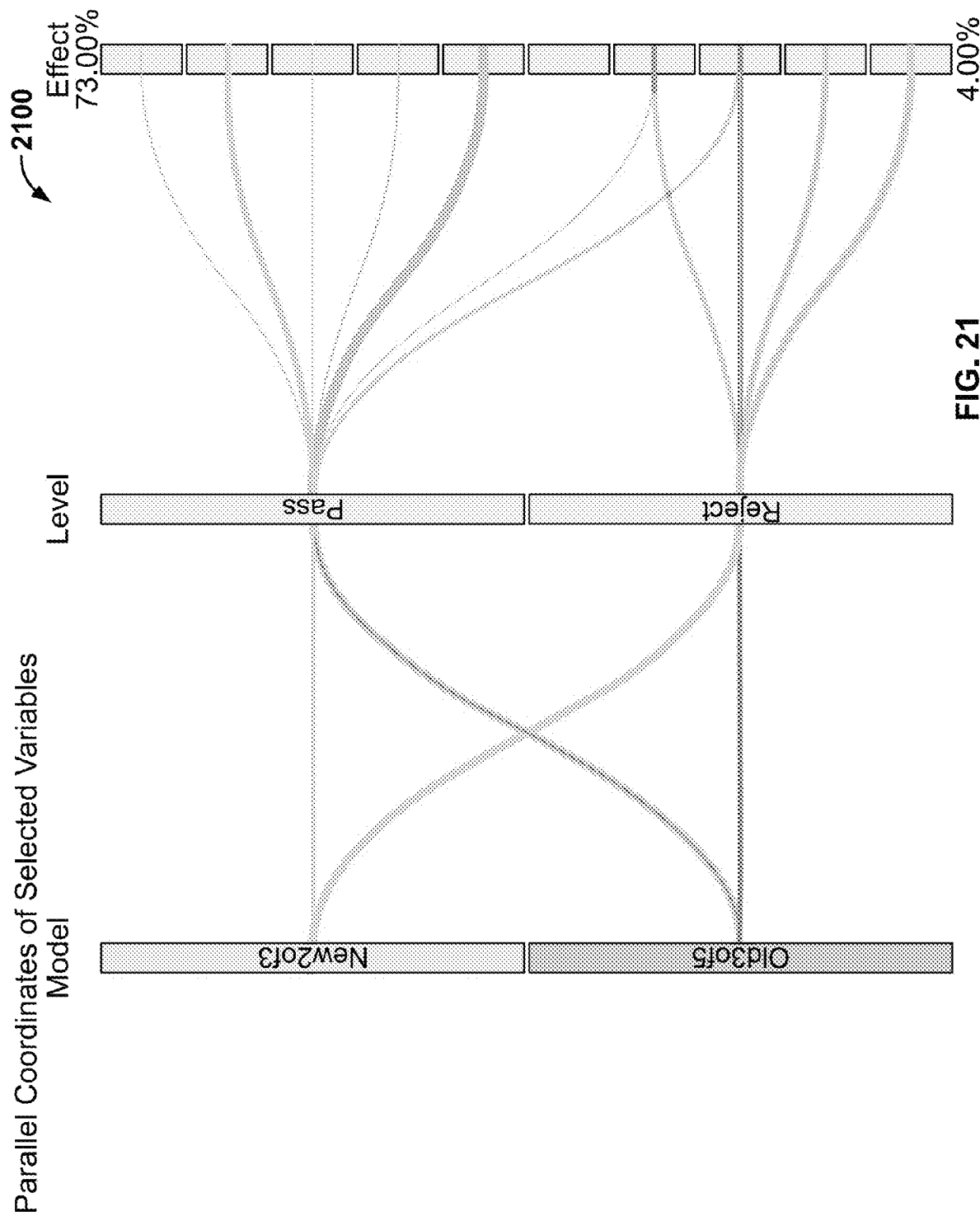
FIG. 21 is an example graph for selecting the prediction factor rule that maximizes the treatment effect, according to certain aspects of the present disclosure.

In block 222 of FIG. 2B and in flow diagram 330 of FIG. 3D, the computing device 102 may generate one or more pass-fail indicators for the one or more selected input variables based on selecting the one or more input variables from the first set of input variables that yields a higher input variable importance for the one or more logical rules of decision metrics. FIG. 11, FIG. 12, FIG. 13, FIG. 14, FIG. 15, and FIG. 16 are example graphical user interfaces for generating pass-fail indicators for selected input variables, according to certain aspects of the present disclosure. Each assay-rate combination by biological active is assigned one or more thresholds (e.g., 0-10, 11-20). If a response/outcome of a field test reaches the one or more thresholds, a pass-fail indicator is assigned (e.g., 0 for "fail" and 1 for "pass"). For example, as shown in FIG. 11, the computing device 102 may generate the one or more pass-fail indicators (e.g., 0, 1) for the one or more selected input variables (e.g., PiamBC2_0.19531) that is shown in the figure as bc0pt19_0 bc0pt19_5, and bc0pt19_10 in a graphical user interface 1100. As shown in FIG. 11, selected input variable bc0pt19_0 has a pass-fail indicator of "1" on row 2 1102 when a rate of 0.19 ppm (e.g., 0pt19) or fewer of compound (e.g., fungicide) 81 is applied to a corn crop and exhibits at least 0% inhibition (e.g., 0) at this rate. The percent inhibition may include a range of about 0 percent to 100 percent at 5 percent increments. Inhibition is the slowing or prevention of a process, reaction, or function by a particular substance. For example, as shown in FIG. 12, the computing device may generate the one or more pass-fail indicators (e.g., 0, 1) for the one or more selected input variables (e.g., PiamBC2_0.19531) that is shown in the figure as bc0pt19_0 bc0pt19_5, bc0pt19_10, and bc0pt19_15 in a graphical user interface 1200. As shown in FIG. 13, the computing device may generate the one or more pass-fail indicators (e.g., 0, 1) for the one or more selected input variables (e.g., PiamBC2_0.19531) that is shown in the figure as bc0pt19_20 bc0pt19_25, bc0pt19_30, bc0pt19_35, bc0pt19_40, bc0pt19_45, bc0pt19_50, and bc0pt19_55 in a graphical user interface 1300. As shown in FIG. 14, the computing device may generate the one or more pass-fail indicators (e.g., 0, 1) for the one or more selected input variables (e.g., PiamBC2_0.19531) that is shown in the figure as bc0pt19_35, bc0pt19_40, bc0pt19_45, bc0pt19_50, bc0pt19_55, bc0pt19_60 bc0pt19_65, and bc0pt19_70 in a graphical user interface 1400. As shown in FIG. 15, the computing device may generate the one or more pass-fail indicators (e.g., 0, 1) for the one or more selected input variables (e.g., PiamPC_0.39063 as shown in FIG. 11) that is shown in the figure as pc0pt39_55, pc0pt39_60, pc0pt39_65, pc0pt39_70, pc0pt39_75, pc0pt39_80, pc0pt39_85, and pc0pt39_90 in a graphical user interface 1500. The selected input variable pc0pt39_70 has a pass-fail indicator of "1" on row 2 1502 when a rate of 0.39 ppm (e.g., 0pt39) or fewer of compound (e.g., fungicide) 81 is applied to the corn crop and exhibits at least 70% inhibition (e.g., 70) at this rate. As shown in FIG. 16, the computing device may generate the one or more pass-fail indicators (e.g., 0, 1) for the one or more selected input variables (e.g., PiamPC_0.39063 as shown in FIG. 11) that is shown in the figure as pc0pt39_70, pc0pt39_75, pc0pt39_80, pc0pt39_85, pc0pt39_90, pc0pt39_95, and pc0pt39_100 in a graphical user interface 1600.

Figure 17:
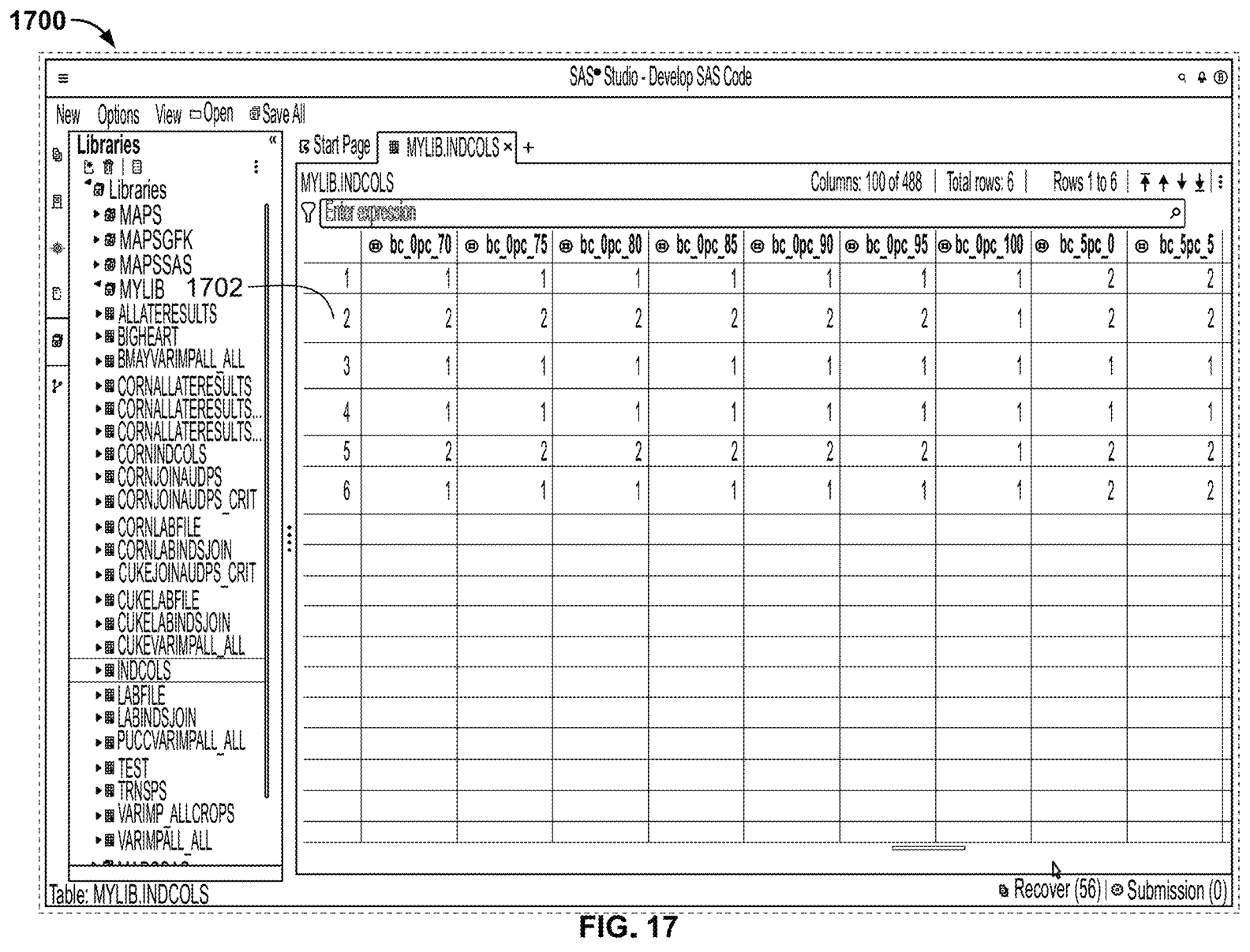

In block 224 of FIG. 2B and in flow diagram 330 of FIG. 3D, the computing device 102 may combine the one or more pass-fail indicators for the one or more selected input variables. For example, the computing device 102 may combine the one or more pass-fail indicators for the one or more selected input variables by averaging, multiplying, or summing the one or more pass-fail indicators (e.g., 0, 1, 2). FIG. 17 is an example graphical user interface for combining pass-fail indicators for selected input variables, according to certain aspects of the present disclosure. A combination of pass-fail indicators across one or more assays or one or more assay-rate combinations provides more information than a single assay. In this example, one or more pass-fail indicators are summed from each permutation of assay-rate combinations. As shown in the graphical user interface 1700 of FIG. 17, the selected input variable bc_0pc_70 has a pass-fail indicator of "2" on row 2 1702. The pass-fail indicator for this variable has a value of "2" by summing the input variable bc0pt19_0 which has a pass-fail indicator of "1" for compound (e.g., fungicide) 81 as shown in FIG. 11 on row 2 1102 and the input variable pc0pt39_70 which has a pass-fail indicator of "1" for compound (e.g., fungicide) 81 as shown in FIG. 15 on row 2 1502.

Figure 3E:
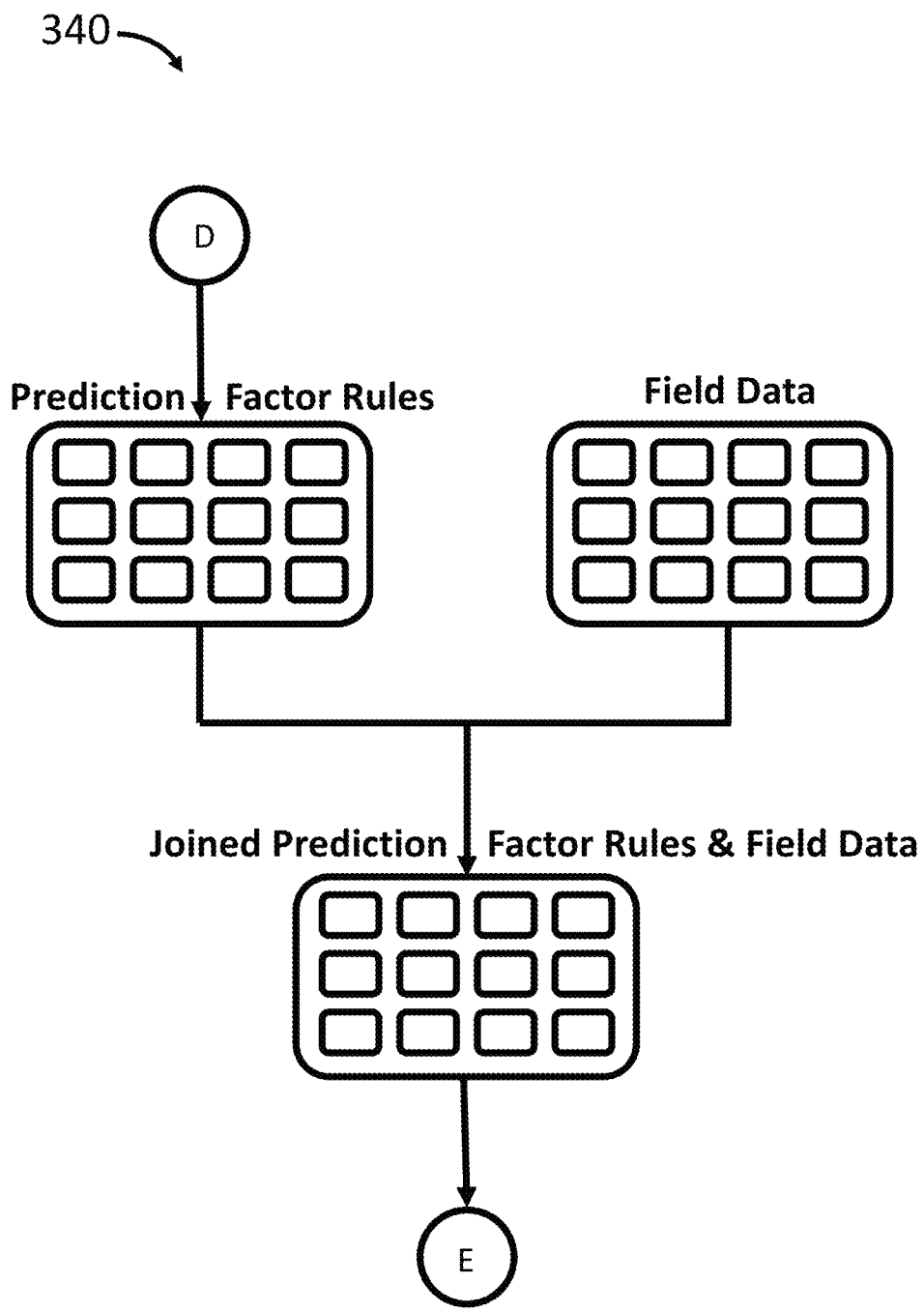
FIG. 3E is an example flow diagram for transforming field data and prediction factor rules for execution with a statistical model, according to certain aspects of the present disclosure.

In block 226 of FIG. 2B and in flow diagram 340 of FIG. 3E, the computing device 102 may generate one or more prediction factor rules based on the combination of the one or more pass-fail indicators for the one or more selected input variables. The generation of the one or more prediction factor rules may include a fifth table with one or more labels for name of prediction factor rule, conditions for the one or more selected input variables, rule components for the one or more selected input variables, and pass-fail indicator (e.g., 0, 1) for the prediction factor rules. The one or more prediction factor rules may include one or more components. The first component can include a cutoff percent inhibition or a percent disease control in the lab. The second component can include a number of selected input variables that achieve the cutoff percent inhibition or the percent disease control in the lab. FIG. 18 is an example table for generating prediction factor rules, according to certain aspects of the present disclosure. Pass-fail indicators (e.g., 0, 1) can be generated from one or more assays simultaneously using logical syntax. In this example, three assays are concatenated, and if the responses are greater than the threshold set for each of the three assays, then the rule passes (e.g., pass-fail indicator=1). For example, as shown in the table 1800 of FIG. 18, the fifth table includes a row 1804 with the name of the prediction factor rule pc_10as_100cs_60. The prediction factor rule pc_10as_100cs_60 includes the selected input variable "pc" at the cutoff percent inhibition of 10 percent, the selected input variable "as" at the cutoff percent inhibition of 100 percent, and the selected input variable "cs" at the cutoff percent inhibition of 60 percent. The prediction factor rule pc_10as_100cs_60 satisfies at least two of three of the conditions that selected input variable "pc" is greater than or equal to 10 percent inhibition, "as" is greater than or equal to 100 percent inhibition, or "cs" is greater than or equal to 60 percent inhibition. The prediction factor rule pc_10as_100cs_60 may include the rule components that determine whether the selected input variable "pc" is greater than or equal to 10 percent inhibition, "as" is greater than or equal to 100 percent inhibition, or "cs" is greater than or equal to 60 percent inhibition. The determination that the selected input variable "pc" is greater than or equal to 10 percent inhibition, "as" is greater than or equal to 100 percent inhibition, or "cs" is greater than or equal to 60 percent inhibition is shown by the pass-fail indicator of "1". The prediction factor rule pc_10as_100cs_60 with a pass-fail indicator of "1" states that at least two of the three following conditions are true: that at least 10% inhibition was observed in the "pc" assay, that exactly 100% inhibition was observed in the "as" assay, and at least 60% inhibition was observed in the "cs" assay.

In block 228 of FIG. 2B and in flow diagram 340 of FIG. 3E, the computing device 102 may transform the field data 600 and the one or more prediction factor rules from the table 1800 into a second format suitable for execution with a statistical model 152. For example, the computing device may transform the field data and the one or more prediction factor rules into a second format suitable for execution with a statistical model by joining the field data and the one or more prediction factor rules and by outputting the joined field data and the one or more prediction factor rules. Joining the field data and the one or more prediction factor rules may include combining the one or more field outcomes for the one or more strains and the one or more prediction factor rules with the pass-fail indicator of "0", or "1" for the one or more strains. The field data 600 may include one or more labels for a strain, one or more labels for one or more rates, or one or more labels for one or more field outcomes. The field data 600 may include one or more strains under the strain label, one or more rates under the rate label, or one or more field outcomes for the one or more strains under the field outcome label in the third table. The field data 600, as shown in FIG. 6, can include the third table that shows a row 602 that includes strain *Anabaena_circinalis* under the strain label that has a field outcome of 16695 for ImmatureNodules and a field outcome of 12700 for MatureNodules at a rate of 1000 ppm. As shown in the table 1800 of FIG. 18, the one or more prediction factor rules may include the fifth table that shows the name of the prediction factor rule, the conditions for the one or more selected input variables, the rule components for the one or more selected input variables, and the pass-fail indicators (e.g., 0, 1) for the one or more prediction factor rules. Outputting the joined field data and the one or more prediction factor rules may include a sixth table 1900 that shows the one or more strains under the strain label at one or more rates under the rate label for one or more replications under the replication label for one or more field outcomes under the field outcome label and one or more prediction factor rules under the prediction factor rule label. FIG. 19 is an example table for transforming the field data and prediction factor rules for execution with a statistical model, according to certain aspects of the present disclosure. Lab rules based on pass-fail indicators are joined with field data including strain, rate (e.g., CFU/mL), replication and two field outcomes. Replication may include a biological repetition (e.g., a block) in the field. Replication is an example of other sources of information in field or lab data sets. The statistical model will use the prediction factor rules to explain, model, or predict the field outcomes based on the rules and other field data. As shown in FIG. 19, outputting the joined field data and the one or more prediction factor rules may include the sixth table 1900 that shows a row 1902 that includes strain *Anabaena_circinalis* under the strain label that has a field outcome of 740 for MatureNodules and a field outcome of 580 for ImmatureNodules at a rate of 1000 CFU/ML with a replication of "2" with the pass-fail indicator of "0" for the prediction factor rule pc_10as_0cs_10, and the pass-fail indicator of "1" for the prediction factor rules pc_10as_0cs_0, pc_10as_0cs_20, pc_10as_0cs_30, pc_10as_0cs_40, pc_10as_0cs_50, pc_10as_0cs_60, pc_10as_0cs_70, and pc_10as_0cs_100.

In block 242 of FIG. 2C and in flow diagram 350 of FIG. 3F, the computing device 102 may execute the statistical model on the transformed field data 600 and the one or more prediction factor rules from the table 1800 to determine a treatment effect for the one or more prediction factor rules. The treatment effect may include an average treatment effect (ATE). The ATE may include a lower confidence interval and an upper confidence interval. The ATE may include the amount by which compounds identified by the prediction factor rule outperform other compounds in the field trials. Executing the statistical model 152 may comprise employing inferential statistics, causal inference, Bayesian procedures, regressions, linear models, nonlinear models, probabilistic graphical methods, etc. to quantify the one or more prediction factor rules within a range of uncertainty or within a confidence or credible interval for Bayesian procedures. Executing the statistical model may also comprise quantifying the one or more prediction factor rules within a range of uncertainty or a confidence interval by estimating respective treatment effects or effects of compounds. FIG. 20 is an example graphical user interface for executing the statistical model on the transformed field data and prediction factor rules to determine a treatment effect for the prediction factor rules and for outputting the treatment effect for the prediction factor rules, according to certain aspects of the present disclosure. As shown in FIG. 20, the average treatment effect (ATE) is 95.1500 for field outcome MatureNodules (e.g., Wald 95% Confidence limits of −73.0272 and 263.33) for prediction factor rule pc_10as_100cs_60. The user would run the statistical model for every plausible prediction factor rule and select the rule representing the set of assays that maximizes the average treatment effect while minimizing the confidence limits. For example, as shown in the graphical user interface 2000 of FIG. 20, executing the statistical model comprises employing the causal inference procedure to quantify the prediction factor rule within a robust standard error, Wald 95% confidence limits, and statistics scores reflecting hypothesis tests (e.g., Z, Pr>|Z|) by estimating the respective treatment effects or effects of compounds. The statistic scores allow the user to determine whether, given the information in the transformed field data, the values are extreme due to chance. The causal treatment procedure quantified the prediction factor rule pc_10as_100cs_60 with a treatment level of "1" at the estimate of 625.60, the robust standard error of 75.9570, Wald 95% confidence limits in the range of about 476.73 and 774.47, and statistic scores Z of 8.24 and Pr>|Z| of <0.0001. The causal treatment procedure quantified the prediction factor rule pc_10as_100cs_60 with a treatment level of "0" at the estimate of 530.45, the robust standard error of 39.7649, Wald 95% confidence limits in the range of about 452.51 and 608.39, and statistic scores Z of 13.34 and Pr>|Z| of <0.0001. The causal inference procedure estimates the average treatment effect of the prediction factor rule pc_10as_100cs_60 as the difference of the prediction factor rule with a treatment level of "1" at the estimate of 625.60 and the prediction factor rule with a treatment level of "0" at the estimate of 530.45 as the value 95.1500. The average treatment effect also has the values for the robust standard error of 85.8063, Wald 95% confidence limits in the range of about −73.0272 and 263.33, and statistic scores Z of 1.11 and Pr>|Z| of 0.2675.

In block 244 of FIG. 2C, the computing device 102 may output the treatment effect for the one or more prediction factor rules. For example, as shown in the graphical user interface 2000 of FIG. 20, the computing device may output the treatment effect, ATE (average treatment effect), as the value 95.1500 for the prediction factor rule.

In block 246 of FIG. 2C and in flow diagram 350 of FIG. 3F, the computing device 102 may select the prediction factor rule that maximizes the treatment effect. FIG. 21 is an example graph for selecting the prediction factor rule that maximizes the treatment effect, according to certain aspects of the present disclosure. Two models (e.g., rules) "Old3of5" and "New2of3" were tested for effect (e.g., average treatment effect). Compounds were assigned a level of pass or reject. Each compound follows a trail from the two models to pass or reject and then to the effect. While the "New2of3" model separates compounds based on the effects (e.g., compounds that pass have consistently high average treatment effects, compounds that reject have consistently low average treatment effects), the effects tend to mix among those passed and rejected for the "Old3of5" model. For example, as shown in the graph 2100 of FIG. 21, the computing device may select the prediction factor rule that maximizes the average treatment effect (ATE) by plotting in a graph one or more models (e.g., arbitrary heuristic rule (Old3of5), prediction factor rule (New2of3)), one or more levels (e.g., pass, reject), and one or more effects of the one or more models (e.g., 4% to 73%). As shown in the graph, the prediction factor rule is more predictive of product (e.g., compound) effect than the arbitrary heuristic rule. The prediction factor rule may include improved separation between compound hits and compound failures in terms of projected effect in the field. A field unit or measure of interest for the projected effect in the field may include efficaciousness, effectiveness, human or animal safety, environmental safety, lower dose, better application profile (e.g., compatibility, dispersion), etc. The average treatment effect may include percent inhibition or percent disease control.

In an alternative embodiment, crop protection research and development may comprise a spectrum of experimental systems. On one end of the spectrum, lab experiments are authentic representation of a problem to solve. On the other end of the spectrum, no lab experiment can directly test the problem in the field. For example, grey mold on a strawberry is an authentic lab experiment. The tools needed for the authentic lab experiment may include a refrigerator and strawberries. Experts can describe and understand each parameter of the lab experiment including temperature, humidity, time in the refrigerator, etc. Lab to field translation is not needed in this experiment since the experiment is highly predictive and can be modeled using linear equations. However, many diseases cannot grow in a laboratory. Crop yield cannot be tested in a laboratory. Most experiments require field-level experimentation to be authentic. Lab-to-field translation can be used where experts cannot create parameters or equations that are reasonably predictive.

In another alternative embodiment, repeated or nested artificial intelligence (AI) models may be included for improved precision in increasing discovery pipeline hit rates, especially for low volume data.

Discovery of new compounds or biological actives is typically a first step of a multi-step process before a candidate reaches a commercial stage, where it can provide industrial and commercial value. The stages between discovery and commercial deployment are time consuming, expensive, error-prone and sensitive to market changes. Aspects of this novel technical disclosure provides discovery pipelines that may reduce, cut, or de-emphasize at least some traditional intervening steps. For example, agricultural products are tested in a lab, then a greenhouse, and then a field. The discovery pipeline may screen over 10,000 candidates. Then, the pipeline may test 100 of the best candidates in the greenhouse. The pipeline would then test one or two of the candidates in the field. Lab-to-field translation saves the time, expense, and uncertainty by reducing, cutting, or de-emphasizing the greenhouse step and proceeding from the lab to the field.

Compounds or biological actives tested in the final stages of the discovery pipeline may not show an outcome that was expected (e.g., lower than expected efficacy). The outcome may include false positives from lab assays. Aspects of this novel technical disclosure decreases false positives in the lab assays.

Compounds may be rejected in lab assay stages that would have shown a desired outcome in the field. The outcome may include false negatives in lab assays. Aspects of this novel technical disclosure decreases false negatives in the lab assays.

Lab assays may inject significant noise into a correlation between lab outcomes and field outcomes. Aspects of this novel technical disclosure provides greater reproducibility between the lab assays and the field outcome. This reproducibility may increase confidence in the lab assays and provide more certainty in selecting assays and compounds and biological actives.

For a clinical trial, aspects of this novel technical disclosure may include the prediction of data acquired from early-stage clinical trials from laboratory assays. For example, person-specific or population-specific effects can be dissected at earlier phases of the clinical trials than previously allowed and provide predictions of effectiveness and safety. A benefit of acquiring these effects at earlier phases of the clinical trials may include saving lives or expediting the completion and approval of the clinical trials.

The foregoing description of certain examples, including illustrated examples, has been presented only for the purpose of illustration and description and is not intended to be exhaustive or to limit the disclosure to the precise forms disclosed. Numerous modifications, adaptations, formats, and uses thereof will be apparent to those skilled in the art without departing from the scope of the disclosure. The examples disclosed herein can be combined or rearranged to yield additional examples.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments. In situations herein, a "prediction" may be referred to as a "forecast".

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be rearranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function. The processes may be performed in parallel using a plurality of threads and/or a plurality of worker computing devices.

Systems depicted in some of the figures can be provided in various configurations. In some examples, the systems can be configured as a distributed system where one or more components of the system are distributed across one or more networks in a cloud computing system.

What is claimed is:

1. A system comprising:
a data processor associated with a computing device; and
a non-transitory computer-readable storage medium comprising instructions that are executable by the data processor for causing the computing device to:
transform lab data and field data into a first format suitable for execution with a supervised machine learning model;
determine whether the supervised machine learning model is a trained supervised machine learning model or an untrained supervised machine learning model;
based on determining that the supervised machine learning model is an untrained supervised machine learning model, train the supervised machine learning model by training with a plurality of individual assay-rate combinations that extract a signal that correlates with separations between compound or biological active hits with compound or biological active failures in predicting one or more field outcomes;
execute the trained supervised machine learning model on the plurality of individual assay-rate combinations to determine an input variable importance for a first set of input variables in predicting the one or more field outcomes;

based on determining the input variable importance for the first set of input variables in predicting the one or more field outcomes, generate one or more logical rules of decision metrics;

select the one or more input variables from the first set of input variables that yields a higher input variable importance for the one or more logical rules of decision metrics;

based on selecting the one or more input variables from the first set of input variables that yields a higher input variable importance for the one or more logical rules of decision metrics, generate one or more pass-fail indicators for the one or more selected input variables;

combine the one or more pass-fail indicators for the one or more selected input variables;

based on the combination of the one or more pass-fail indicators for the one or more selected input variables, generate one or more prediction factor rules;

transform the field data and the one or more prediction factor rules into a second format suitable for execution with a statistical model;

execute the statistical model on the transformed field data and the one or more prediction factor rules to determine a treatment effect for the one or more prediction factor rules;

output the treatment effect for the one or more prediction factor rules; and select the prediction factor rule that maximizes the treatment effect of predicting the one or more field outcomes of a performance of compounds or biological actives within a range of uncertainty.

2. The system of claim 1, wherein the plurality of individual assay-rate combinations comprises:

an individual assay-rate combination that is not predictive of the one or more field outcomes, the individual assay-rate combination comprising one or more lab assays that include noise in a correlation of lab outcomes and field outcomes.

3. The system of claim 1, wherein training the supervised machine learning model further comprises:

training a plurality of random forests with in-bag fraction and a random seed for the transformed lab data and field data; and the non-transitory computer-readable storage medium comprises instructions to validate an out-of-bag fraction of the transformed lab data and field data to:
score the out-of-bag fraction of the transformed data to determine results for the input variable importance; and
average the results for the input variable importance.

4. The system of claim 3, wherein each random forest of the plurality of random forests is unique;

wherein each out-of-bag fraction of data is unique; and
wherein each random seed is unique.

5. The system of claim 1, wherein the supervised machine learning model comprises a random forest model, a neural network model, a gradient boost model, a Bayesian model, an ensemble model comprising multiple machine learning models, or a champion model selected from multiple machine learning and statistical models.

6. The system of claim 1, further comprising displaying the input variable importance for the first set of input variables in a graphical user interface.

7. The system of claim 1, wherein the higher input variable importance for the one or more logical rules of decision metrics comprises a moving average of the one or more selected input variables from the first set of input variables that exceeds a moving average of one or more not selected input variables from the first set of input variables for the one or more field outcomes.

8. The system of claim 1, wherein executing the statistical model comprises employing inferential statistics, causal inference, Bayesian procedures, regressions, linear models, nonlinear models, or probabilistic graphical methods to quantify the one or more prediction factor rules within a range of uncertainty.

9. The system of claim 1, wherein executing the statistical model comprises quantifying the one or more prediction factor rules within a range of uncertainty by estimating respective treatment effects or effects of compounds.

10. The system of claim 1, wherein the transformation of the lab data and the field data into the first format causes the computing device to:
transpose the lab data;
output the transposed lab data;
join the transposed lab data and the field data; and
output the joined transposed lab data and the field data.

11. The system of claim 1, wherein the transformation of the field data and the one or more prediction factor rules into the second format causes the computing device to:
join the field data and the one or more prediction factor rules; and
output the joined field data and the one or more prediction factor rules.

12. A method comprising:
transforming, by a computing device, lab data and field data into a first format suitable for execution with a supervised machine learning model;

determining, by a computing device, whether the supervised machine learning model is a trained supervised machine learning model or an untrained supervised machine learning model;

based on determining that the supervised machine learning model is an untrained supervised machine learning model, training the supervised machine learning model by training with a plurality of individual assay-rate combinations that extract a signal that correlates with separations between compound or biological active hits with compound or biological active failures in predicting one or more field outcomes;

executing, by the computing device, the trained supervised machine learning model on the plurality of individual assay-rate combinations to determine an input variable importance for a first set of input variables in predicting the one or more field outcomes;

based on determining the input variable importance for the first set of input variables in predicting the one or more field outcomes, generating, by the computing device, one or more logical rules of decision metrics;

selecting, by the computing device, the one or more input variables from the first set of input variables that yields a higher input variable importance for the one or more logical rules of decision metrics;

based on selecting the one or more input variables from the first set of input variables that yields a higher input variable importance for the one or more logical rules of decision metrics, generating, by the computing device, one or more pass-fail indicators for the one or more selected input variables;

combining, by the computing device, the one or more pass-fail indicators for the one or more selected input variables;

based on the combination of the one or more pass-fail indicators for the one or more selected input variables, generating, by the computing device, one or more prediction factor rules;

transforming, by the computing device, the field data and the one or more prediction factor rules into a second format suitable for execution with a statistical model;

executing, by the computing device, the statistical model on the transformed field data and the one or more prediction factor rules to determine a treatment effect for the one or more prediction factor rules;

outputting, by the computing device, the treatment effect for the one or more prediction factor rules; and selecting, by the computing device, the prediction factor rule that maximizes the treatment effect of predicting the one or more field outcomes of a performance of compounds or biological actives within a range of uncertainty.

13. The method of claim 12, wherein the plurality of individual assay-rate combinations comprises:

an individual assay-rate combination that is not predictive of the one or more field outcomes, the individual assay-rate combination comprising one or more lab assays that include noise in a correlation of lab outcomes and field outcomes.

14. The method of claim 12, wherein training the supervised machine learning model further comprises training a plurality of random forests with in-bag fraction and a random seed for the transformed lab data and field data; and validating an out-of-bag fraction of the transformed lab data and field data by:

scoring the out-of-bag fraction of the transformed data to determine results for the input variable importance; and averaging the results for the input variable importance.

15. The method of claim 14, wherein each random forest of the plurality of random forests is unique;

wherein each out-of-bag fraction of data is unique; and wherein each random seed is unique.

16. The method of claim 12, wherein the supervised machine learning model comprises a random forest model, a neural network model, a gradient boost model, a Bayesian model, an ensemble model comprising multiple machine learning models, or a champion model selected from multiple machine learning and statistical models.

17. The method of claim 12, further comprising displaying the input variable importance for the first set of input variables in a graphical user interface.

18. The method of claim 12, wherein the higher input variable importance for the one or more logical rules of decision metrics comprises a moving average of the one or more selected input variables from the first set of input variables that exceeds a moving average of one or more not selected input variables from the first set of input variables for the one or more field outcomes.

19. The method of claim 12, wherein executing the statistical model comprises employing inferential statistics, causal inference, Bayesian procedures, regressions, linear models, nonlinear models, or probabilistic graphical methods to quantify the one or more prediction factor rules within a range of uncertainty.

20. The method of claim 12, wherein executing the statistical model comprises quantifying the one or more prediction factor rules within a range of uncertainty by estimating respective treatment effects or effects of compounds.

21. The method of claim 12, wherein the transformation of the lab data and the field data into the first format causes the computing device to:

transpose the lab data;

output the transposed lab data;

join the transposed lab data and the field data; and output the joined transposed lab data and the field data.

22. The method of claim 12, wherein the transformation of the field data and the one or more prediction factor rules into the second format causes the computing device to:

join the field data and the one or more prediction factor rules; and output the joined field data and the one or more prediction factor rules.

23. A non-transitory computer-readable storage medium comprising instructions that are executable by a data processor for causing a computing device to:

transform lab data and field data into a first format suitable for execution with a supervised machine learning model;

determine whether the supervised machine learning model is a trained supervised machine learning model or an untrained supervised machine learning model;

based on determining that the supervised machine learning model is an untrained supervised machine learning model, train the supervised machine learning model by training with a plurality of individual assay-rate combinations that extract a signal that correlates with separations between compound or biological active hits with compound or biological active failures in predicting one or more field outcomes;

execute the trained supervised machine learning model on the plurality of individual assay-rate combinations to determine an input variable importance for a first set of input variables in predicting the one or more field outcomes;

based on determining the input variable importance for the first set of input variables in predicting the one or more field outcomes, generate one or more logical rules of decision metrics;

select the one or more input variables from the first set of input variables that yields a higher input variable importance for the one or more logical rules of decision metrics;

based on selecting the one or more input variables from the first set of input variables that yields a higher input variable importance for the one or more logical rules of decision metrics, generate one or more pass-fail indicators for the one or more selected input variables;

combine the one or more pass-fail indicators for the one or more selected input variables;

based on the combination of the one or more pass-fail indicators for the one or more selected input variables, generate one or more prediction factor rules;

transform the field data and the one or more prediction factor rules into a second format suitable for execution with a statistical model;

execute the statistical model on the transformed field data and the one or more prediction factor rules to determine a treatment effect for the one or more prediction factor rules;

output the treatment effect for the one or more prediction factor rules; and select the prediction factor rule that maximizes the treatment effect of predicting the one or more field outcomes of a performance of compounds or biological actives within a range of uncertainty.

24. The non-transitory computer-readable storage medium of claim 23, wherein the plurality of individual assay-rate combinations comprises:
an individual assay-rate combination that is not predictive of the one or more field outcomes, the individual assay-rate combination comprising one or more lab assays that include noise in a correlation of lab outcomes and field outcomes.

25. The non-transitory computer-readable storage medium of claim 23, wherein training the supervised machine learning model further comprises training a plurality of random forests with in-bag fraction and a random seed for the transformed lab data and field data; and the non-transitory computer-readable storage medium comprises instructions to validate an out-of-bag fraction of the transformed lab data and field data to:
score the out-of-bag fraction of the transformed data to determine results for the input variable importance; and
average the results for the input variable importance.

26. The non-transitory computer-readable storage medium of claim 25, wherein each random forest of the plurality of random forests is unique;
wherein each out-of-bag fraction of data is unique; and
wherein each random seed is unique.

27. The non-transitory computer-readable storage medium of claim 23, wherein the supervised machine learning model comprises a random forest model, a neural network model, a gradient boost model, a Bayesian model, an ensemble model comprising multiple machine learning models, or a champion model selected from multiple machine learning and statistical models.

28. The non-transitory computer-readable storage medium of claim 23, further comprising displaying the input variable importance for the first set of input variables in a graphical user interface.

29. The non-transitory computer-readable storage medium of claim 23, wherein the higher input variable importance for the one or more logical rules of decision metrics comprises a moving average of the one or more selected input variables from the first set of input variables that exceeds a moving average of one or more not selected input variables from the first set of input variables for the one or more field outcomes.

30. The non-transitory computer-readable storage medium of claim 23, wherein executing the statistical model comprises employing inferential statistics, causal inference, Bayesian procedures, regressions, linear models, nonlinear models, or probabilistic graphical methods to quantify the one or more prediction factor rules within a range of uncertainty.

* * * * *

UNITED STATES PATENT AND TRADEMARK OFFICE
CERTIFICATE OF CORRECTION

PATENT NO. : 11,373,121 B2
APPLICATION NO. : 17/483093
DATED : June 28, 2022
INVENTOR(S) : John Wesley Gottula et al.

It is certified that error appears in the above-identified patent and that said Letters Patent is hereby corrected as shown below:

On the Title Page

(74) Attorney, Agent, or Firm:
Add the Firm --The Law Office of Tiffany E. Monroe, LLC--.

In the Claims

Column 22, Line 37:
Delete the phrase "determining, by a computing device, whether the super-" and replace with
--determining, by the computing device, whether the super- --.

Column 22, Line 43:
Delete the phrase "model, training the supervised machine learning model" and replace with --model, training, by the computing device, the supervised machine learning model--.

Signed and Sealed this
Ninth Day of August, 2022

Katherine Kelly Vidal
*Director of the United States Patent and Trademark Office*